United States Patent
Lee

(10) Patent No.: US 12,483,831 B2
(45) Date of Patent: Nov. 25, 2025

(54) WIRELESS AUDIO TRANSMISSION DEVICE, WIRELESS SOUND OUTPUT DEVICE, AND SYSTEM HAVING SAME

(71) Applicant: LG ELECTRONICS INC., Seoul (KR)

(72) Inventor: Jinseong Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 378 days.

(21) Appl. No.: 18/026,306

(22) PCT Filed: Sep. 14, 2020

(86) PCT No.: PCT/KR2020/012381
§ 371 (c)(1),
(2) Date: Mar. 14, 2023

(87) PCT Pub. No.: WO2022/055003
PCT Pub. Date: Mar. 17, 2022

(65) Prior Publication Data
US 2023/0362543 A1 Nov. 9, 2023

(51) Int. Cl.
*H04B 7/00* (2006.01)
*H04R 3/12* (2006.01)
(Continued)

(52) U.S. Cl.
CPC ............ *H04R 3/12* (2013.01); *H04W 56/001* (2013.01); *H04R 2420/07* (2013.01); *H04W 88/10* (2013.01)

(58) Field of Classification Search
CPC .. H04R 3/12; H04W 56/001; H04W 56/0025; H04W 72/27; H04W 72/29
See application file for complete search history.

(56) References Cited

U.S. PATENT DOCUMENTS

| 8,090,115 B2 | 1/2012 | Noto |
| 9,900,692 B2 * | 2/2018 | McCoy .................... H04R 3/12 |

(Continued)

FOREIGN PATENT DOCUMENTS

| KR | 1020110065901 | 6/2011 |
| KR | 101454136 | 10/2014 |

(Continued)

OTHER PUBLICATIONS

PCT International Application No. PCT/KR2020/012381, International Search Report dated Jun. 10, 2021, 5 pages.

*Primary Examiner* — Tuan Pham
(74) *Attorney, Agent, or Firm* — LEE, HONG, DEGERMAN, KANG & WAIMEY

(57) ABSTRACT

The present invention relates to a wireless audio transmission device, a wireless sound output device, and a system having same. A wireless audio transmission device according to one embodiment of the present invention comprises: a communication unit for wirelessly transmitting an audio signal to a plurality of wireless sound output devices; and a processor for controlling the communication unit, wherein, when the wireless audio transmission device is in an access point mode and the plurality of wireless sound output devices are in a station mode, the communication unit wirelessly transmits a synchronization request message to the plurality of wireless sound output devices and wirelessly receives a synchronization response message from at least one of the plurality of wireless sound output devices; and after receiving the synchronization response message, when the wireless audio transmission device is in the station mode and a first wireless sound output device among the plurality of wireless sound output devices is in the access point mode, the communication unit wirelessly receives a second synchronization request message from the first wireless sound output device, and wirelessly transmits a second synchro- (Continued)

nization response message from the first wireless sound output device. Accordingly, it is possible to reduce a synchronization error in a wireless sound output system.

20 Claims, 16 Drawing Sheets

(51) Int. Cl.
*H04W 56/00* (2009.01)
*H04W 88/10* (2009.01)

(56) References Cited

U.S. PATENT DOCUMENTS

| 11,178,601 B2* | 11/2021 | Young | H04R 3/12 |
| 2015/0055781 A1* | 2/2015 | Chen | H04R 5/04 |
| | | | 381/2 |

FOREIGN PATENT DOCUMENTS

| KR | 1020170105795 | 9/2017 |
| WO | 2015065125 | 5/2015 |

* cited by examiner

WIRELESS AUDIO TRANSMISSION DEVICE, WIRELESS SOUND OUTPUT DEVICE, AND SYSTEM HAVING SAME

CROSS-REFERENCE TO RELATED APPLICATIONS

This application is the National Stage filing under 35 U.S.C. 371 of International Application No. PCT/KR2020/012381, filed on Sep. 14, 2020, the contents of which are all incorporated by reference herein in their entirety.

BACKGROUND

1. Field

The present disclosure relates to a wireless audio transmission device, a wireless sound output device, and a system having the same, and more particularly, to a wireless audio transmission device, a wireless sound output device, and a system having the same which can reduce synchronization errors in a wireless sound output system.

2. Description of the Related Art

The wireless sound output device receives the audio signal wirelessly from an external wireless audio transmission device and converts the received audio signal into a sound output.

According to RFC-1361 SNTP standard (hereinafter, referred to as "prior art document 1"), a signal transmission device transmits a synchronization request message, at a time t1, a signal reception device receives the synchronization request message, at a time t2, the signal transmission device transmits a synchronization response message, at a time t3, and the signal receiving device, at a time t4, receives the synchronization response message.

Accordingly, according to prior art document 1, a clock offset is computed for $\{(t2-t1)-(t4-t4)\}/2$.

However, according to prior art document 1, if the synchronization request message from the signal transmission device is not received by the signal reception device, the synchronization request message needs to be retransmitted after a predetermined time, and accordingly, the problem occurs that the synchronization error is increased.

According to the Time Synchronization Function (TSF) of IEEE 802.11 standard (hereinafter, referred to as "prior art document 2"), an access point device periodically transmits a beacon message containing a timestamp.

According to prior art document 2, the reception device utilizes the local time on which a beacon message is received and the timestamp information in the beacon message, to calculate the time offset between the access point device and the reception device.

However, according to prior art document 2, since the beacon message needs to be transmitted periodically, there is a disadvantage that a separate hardware construction for wireless communication is required, and it is difficult to use the construction universally.

SUMMARY

It is an object of the present disclosure to provide a wireless audio transmission device, a wireless sound output device, and a system having the same which can reduce synchronization error in a wireless sound output system.

It is another object of the present disclosure to provide a wireless audio transmission device, a wireless sound output device, and a system having the same which can be implemented universally without a periodic message transmission in a wireless sound output system.

It is another object of the present disclosure to provide a wireless audio transmission device, a wireless sound output device, and a system having the same of which a switch between an access point mode and a station mode is available in a wireless sound output system.

In accordance with an aspect of the present disclosure, a wireless audio transmission device includes a transceiver configured to transmit an audio signal wirelessly to a plurality of wireless sound output devices; and a processor configured to control the transceiver, wherein, based on the wireless audio transmission device being in an access point mode and the plurality of wireless sound output devices being in a station mode, the transceiver is configured to transmit a synchronization request message wirelessly to the plurality of wireless sound output devices and receive a synchronization response message wirelessly from at least one of the plurality of wireless sound output devices, and wherein, after receiving the synchronization response message, based on the wireless audio transmission device being in the station mode and a first wireless sound output device among the plurality of wireless sound output devices being in the access point mode, the transceiver is configured to receive a second synchronization request message wirelessly from the first wireless sound output device and transmit a second synchronization response message wirelessly to the first wireless sound output device.

Meanwhile, in a state in which the processor receives the synchronization response message from at least one of the plurality of wireless sound output devices, when a calculation of a time offset for the plurality of wireless sound output devices is not completed based on the received synchronization response message, the processor may be configured to switch the wireless audio transmission device from the access point mode to the station mode.

Meanwhile, in a state in which the processor receives the synchronization response message from at least one of the plurality of wireless sound output devices, when a calculation of a time offset for the plurality of wireless sound output devices is completed based on the received synchronization response message, the processor may control transmit an audio signal corresponding to the predetermined time offset to the plurality of wireless sound output devices, respectively.

Meanwhile, the transceiver may transmit an audio packet including playback time information, which is predetermined based on the time offset, to each of the wireless sound output devices SPK-A to SPK-D wirelessly.

Meanwhile, the transceiver may receive information regarding the second synchronization response message for at least some of the plurality of wireless sound output devices received from the first wireless sound output device wirelessly, and when a calculation for a time offset for the plurality of wireless sound output devices is completed based on the information regarding the second synchronization response message for at least some of the plurality of wireless sound output devices, the processor may control transmit an audio signal corresponding to the predetermined time offset to the plurality of wireless sound output devices, respectively.

Meanwhile, the transceiver may transmit an audio packet including playback time information, which is predetermined based on the time offset, to each of the wireless sound output devices wirelessly.

Meanwhile, the synchronization request message may include a broadcast message, and the synchronization response message includes a unicast message.

Meanwhile, the synchronization request message may include a Wi-Fi broadcast message.

Meanwhile, the synchronization request message may include message type information and sequence number information, and the synchronization response message may include message type information, sequence number information, device ID information, and reception time information of the synchronization request message.

In accordance with another aspect of the present disclosure, a wireless sound output device includes a transceiver configured to receive an audio signal wirelessly from a wireless audio transmission device; an audio output device configured to output sound based on the audio signal received in the transceiver; and a processor configured to control the audio output device, wherein, based on the wireless audio transmission device being in an access point mode and the plurality of wireless sound output devices being in a station mode, the transceiver is configured to receive a synchronization request message wirelessly from the wireless sound output devices and transmit a synchronization response message wirelessly in response to the synchronization request message, and wherein, after receiving the synchronization response message, based on the wireless audio transmission device being in the station mode and the wireless sound output device being switched to the access point mode, the transceiver is configured to transmit a second synchronization request message wirelessly to the wireless audio transmission device and a plurality of wireless sound output devices and receive a second synchronization response message wirelessly from the wireless audio transmission device and at least some of the plurality of wireless sound output devices in response to the synchronization response message.

Meanwhile, the transceiver may transmit information regarding the second synchronization response message respectively received from at least some of the plurality of wireless sound output devices wirelessly to the wireless audio transmission device.

Meanwhile, the transceiver may receive an audio signal corresponding to a time offset configured from the wireless audio transmission device, and in response to the predetermined time offset, the audio output device may output the corresponding sound.

Meanwhile, the transceiver may receive an audio packet including playback time information, which is predetermined from the wireless audio transmission device, and in response to the configured playback time information, the audio output device may output sound corresponding to the audio packet.

In accordance with another aspect of the present disclosure, a wireless sound output system includes a wireless audio transmission device; and a plurality of wireless sound output devices, wherein, based on the wireless audio transmission device being in an access point mode and the plurality of wireless sound output devices being in a station mode, the wireless audio transmission device is configured to transmit a synchronization request message wirelessly to the plurality of wireless sound output devices and receive a synchronization response message wirelessly from at least one of the plurality of wireless sound output devices, and wherein, based on a calculation of a time offset for the plurality of wireless sound output devices being not completed, the wireless audio transmission device is switched from the access point mode to the station mode, and any one sound output device among the plurality of wireless sound output devices is switched from the station mode to the access point mode.

Effects of the Disclosure

In accordance with an aspect of the present disclosure, a wireless audio transmission device includes a transceiver configured to transmit an audio signal wirelessly to a plurality of wireless sound output devices; and a processor configured to control the transceiver, wherein, based on the wireless audio transmission device being in an access point mode and the plurality of wireless sound output devices being in a station mode, the transceiver is configured to transmit a synchronization request message wirelessly to the plurality of wireless sound output devices and receive a synchronization response message wirelessly from at least one of the plurality of wireless sound output devices, and wherein, after receiving the synchronization response message, based on the wireless audio transmission device being in the station mode and a first wireless sound output device among the plurality of wireless sound output devices being in the access point mode, the transceiver is configured to receive a second synchronization request message wirelessly from the first wireless sound output device and transmit a second synchronization response message wirelessly to the first wireless sound output device. Accordingly, the synchronization error can be reduced between the wireless audio transmission device and the plurality of wireless sound output devices.

Particularly, in the wireless sound output system, a switching between the access point mode and the station mode becomes available, and accordingly, the system can be implemented universally without a periodic message transmission in a wireless sound output system.

Meanwhile, in a state in which the processor receives the synchronization response message from at least one of the plurality of wireless sound output devices, when a calculation of a time offset for the plurality of wireless sound output devices is not completed based on the received synchronization response message, the processor may be configured to switch the wireless audio transmission device from the access point mode to the station mode. Accordingly, switching between the access point and the station mode is available selectively, and consequently, the synchronization error can be reduced between the wireless audio transmission device and the plurality of wireless sound output devices.

Meanwhile, in a state in which the processor receives the synchronization response message from at least one of the plurality of wireless sound output devices, when a calculation of a time offset for the plurality of wireless sound output devices is completed based on the received synchronization response message, the processor may control transmit an audio signal corresponding to the predetermined time offset to the plurality of wireless sound output devices, respectively. Accordingly, the synchronization error can be reduced between the wireless audio transmission device and the plurality of wireless sound output devices.

Meanwhile, the transceiver may transmit an audio packet including playback time information, which is predetermined based on the time offset, to each of the wireless sound output devices wirelessly. Accordingly, the synchronization error can be reduced between the wireless audio transmission device and the plurality of wireless sound output devices.

Meanwhile, the transceiver may receive information regarding the second synchronization response message for at least some of the plurality of wireless sound output devices received from the first wireless sound output device wirelessly, and when a calculation for a time offset for the plurality of wireless sound output devices is completed based on the information regarding the second synchronization response message for at least some of the plurality of wireless sound output devices, the processor may control transmit an audio signal corresponding to the predetermined time offset to the plurality of wireless sound output devices, respectively. Accordingly, the synchronization error can be reduced between the wireless audio transmission device and the plurality of wireless sound output devices.

Meanwhile, the transceiver may transmit an audio packet including playback time information, which is predetermined based on the time offset, to each of the wireless sound output devices wirelessly. Accordingly, the synchronization error can be reduced between the wireless audio transmission device and the plurality of wireless sound output devices.

Meanwhile, the synchronization request message may include a broadcast message, and the synchronization response message may include a unicast message. Accordingly, the synchronization request message may be transmitted to the plurality of wireless sound output devices.

Meanwhile, the synchronization request message may include a Wi-Fi broadcast message. Accordingly, the synchronization request message may be transmitted to the plurality of wireless sound output devices.

In accordance with another aspect of the present disclosure, a wireless sound output device includes a transceiver configured to receive an audio signal wirelessly from a wireless audio transmission device; an audio output device configured to output sound based on the audio signal received in the transceiver; and a processor configured to control the audio output device, wherein, based on the wireless audio transmission device being in an access point mode and the plurality of wireless sound output devices being in a station mode, the transceiver is configured to receive a synchronization request message wirelessly from the wireless sound output devices and transmit a synchronization response message wirelessly in response to the synchronization request message, and wherein, after receiving the synchronization response message, based on the wireless audio transmission device being in the station mode and the wireless sound output device being switched to the access point mode, the transceiver is configured to transmit a second synchronization request message wirelessly to the wireless audio transmission device and a plurality of wireless sound output devices and receive a second synchronization response message wirelessly from the wireless audio transmission device and at least some of the plurality of wireless sound output devices in response to the synchronization response message. Accordingly, the synchronization error can be reduced between the wireless audio transmission device and the plurality of wireless sound output devices.

Particularly, in the wireless sound output system, a switching between the access point mode and the station mode becomes available, and accordingly, the system can be implemented universally without a periodic message transmission in a wireless sound output system.

Meanwhile, the transceiver may transmit information regarding the second synchronization response message respectively received from at least some of the plurality of wireless sound output devices wirelessly to the wireless audio transmission device. Accordingly, the synchronization error can be reduced between the wireless audio transmission device and the plurality of wireless sound output devices.

Meanwhile, the transceiver may receive an audio signal corresponding to a time offset configured from the wireless audio transmission device, and in response to the predetermined time offset, the audio output device may output the corresponding sound. Accordingly, the synchronization error can be reduced between the wireless audio transmission device and the plurality of wireless sound output devices.

Meanwhile, the transceiver may receive an audio packet including playback time information, which is predetermined from the wireless audio transmission device, and in response to the configured playback time information, the audio output device may output sound corresponding to the audio packet. Accordingly, the synchronization error can be reduced between the wireless audio transmission device and the plurality of wireless sound output devices.

In accordance with another aspect of the present disclosure, a wireless sound output system includes a wireless audio transmission device; and a plurality of wireless sound output devices, wherein, based on the wireless audio transmission device being in an access point mode and the plurality of wireless sound output devices being in a station mode, the wireless audio transmission device is configured to transmit a synchronization request message wirelessly to the plurality of wireless sound output devices and receive a synchronization response message wirelessly from at least one of the plurality of wireless sound output devices, and wherein, based on a calculation of a time offset for the plurality of wireless sound output devices being not completed, the wireless audio transmission device is switched from the access point mode to the station mode, and any one sound output device among the plurality of wireless sound output devices is switched from the station mode to the access point mode. Accordingly, the synchronization error can be reduced between the wireless audio transmission device and the plurality of wireless sound output devices.

Particularly, in the wireless sound output system, a switching between the access point mode and the station mode becomes available, and accordingly, the system can be implemented universally without a periodic message transmission in a wireless sound output system.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION OF THE PREFERRED EMBODIMENTS

Reference will now be made in detail to the preferred embodiments of the present disclosure, examples of which are illustrated in the accompanying drawings.

The suffixes "module" and "unit" in elements used in description below are given only in consideration of ease in preparation of the specification and do not have specific meanings or functions. Therefore, the suffixes "module" and "unit" may be used interchangeably.

Figure 1:
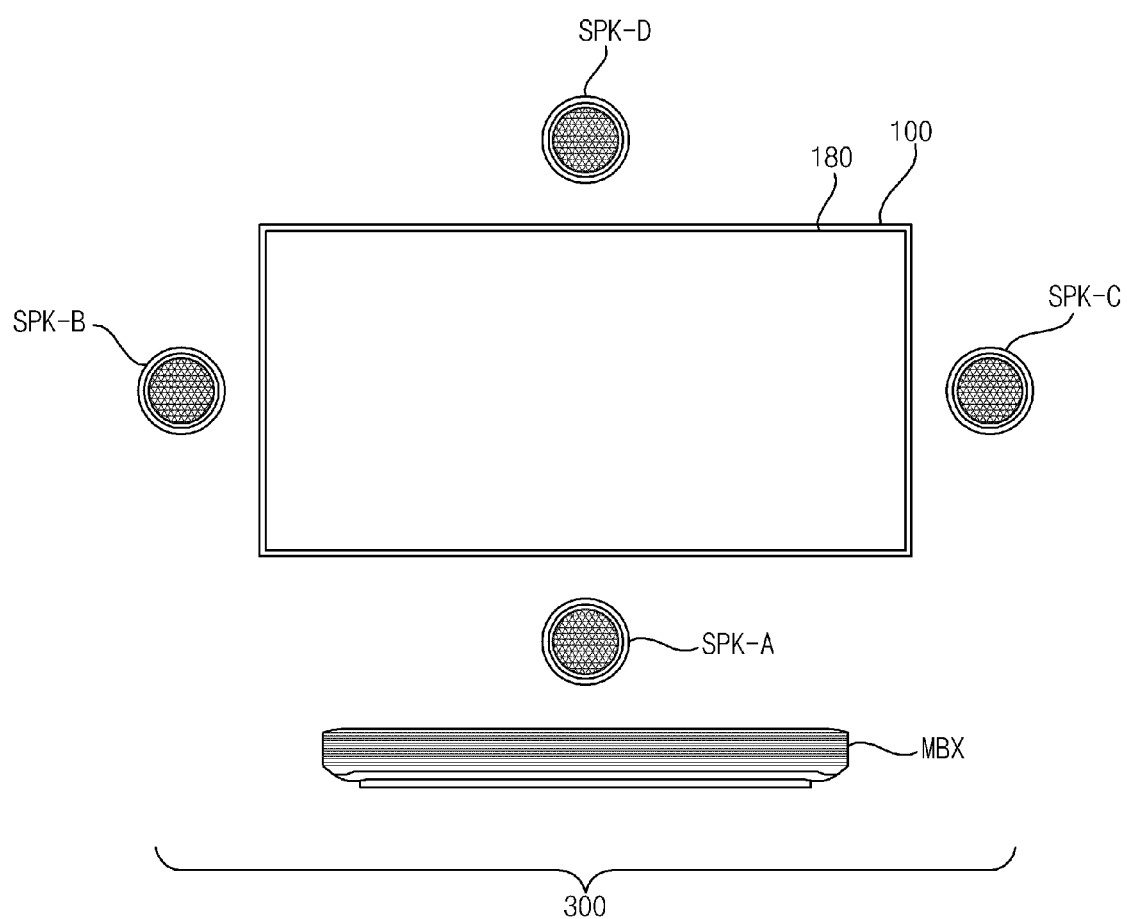
FIG. 1 illustrates an outer appearance of an image display system according to an embodiment of the present disclosure.

FIG. 1 illustrates an outer appearance of an image display system according to an embodiment of the present disclosure.

Referring to FIG. 1, an image display system 10 according to an embodiment of the present disclosure may include an image display device 100 and a wireless sound output system 300.

The image display device 100 may include a display 180.

The image display device 100 may receive an image signal from external various devices, process the signal, and display this on the display 180.

The external various devices may be a computer (PC), a mobile terminal 600 such as a smartphone, a set top box (STB), a game console (GSB), a server (SVR), and the like, for example.

Meanwhile, the display 180 may be implemented by any one of various panels. For example, the display 180 may be one of an organic light luminescent panel (OLED panel), an inorganic light luminescent panel (LED panel), a micro LED panel, and the like.

The wireless sound output system 300 according to an embodiment of the present disclosure may include a wireless audio transmission device MBX and a plurality of wireless sound output devices SPK-A to SPK-D.

Among the plurality of wireless sound output devices SPK-A to SPK-D, the first wireless sound output device SPK-A may be a front wireless speaker, the second and third wireless sound output devices SPK-B and SPK-C may be a left wireless speaker and a right wireless speaker, respectively, and the fourth sound output device SPK-D may be a rear wireless speaker.

For example, the wireless audio transmission device MBX may be a signal processing device, and may divide an audio signal and an image signal input from the exterior, transmit the image signal to the image display device 100 in wireless or wired manner, and transmit the audio signal to the plurality of wireless sound output devices SPK-A to SPK-D.

Accordingly, based on a radio environment, the images may be watched using the image display device 100, and the sounds may be listened by the plurality of wireless sound output devices SPK-A to SPK-D.

Meanwhile, in the case that the plurality of wireless sound output devices SPK-A to SPK-D is used, the playback time needs to be synchronized. However, depending on a radio environment, a case in which the playback time is not synchronized occurs.

Specifically, in the case that the wireless audio transmission device MBX wirelessly transmits audio signals to the plurality of wireless sound output devices SPK-A to SPK-D, respectively, the synchronization error may occur.

Accordingly, in the present disclosure, a method is proposed to reduce the synchronization error in the wireless sound output system 300. Particularly, a method in which the wireless sound output system 300 may be implemented universally through a switch between an access point mode and a station mode, without periodic message transmission, is proposed.

For this, the wireless sound output system 300 according to an embodiment of the present disclosure may include the wireless audio transmission device MBX and the plurality of wireless sound output devices SPK-A to SPK-D.

In the case that the wireless audio transmission device MBX in the wireless sound output system 300 is in the access point mode and the plurality of wireless sound output devices SPK-A to SPK-D is in the station mode, the wireless audio transmission device MBX transmits a synchronization request message to the plurality of wireless sound output devices SPK-A to SPK-D wirelessly, receives a synchronization response message from at least one of the plurality of wireless sound output devices SPK-A to SPK-D wirelessly, if a calculation of a time offset for the plurality of wireless sound output devices SPK-A to SPK-D is not completed, the wireless audio transmission device MBX is switched from the access point mode to the station mode, and at least one wireless sound output device among the plurality of wireless sound output devices SPK-A to SPK-D is switched from the station mode to the access point mode. Accordingly, the synchronization error can be reduced in the wireless sound output system 300.

Meanwhile, the image display device 100 shown in FIG. 1 may be a TV, a monitor, a tablet PC, a mobile terminal, a display device for a vehicle, and the like.

Figure 2:
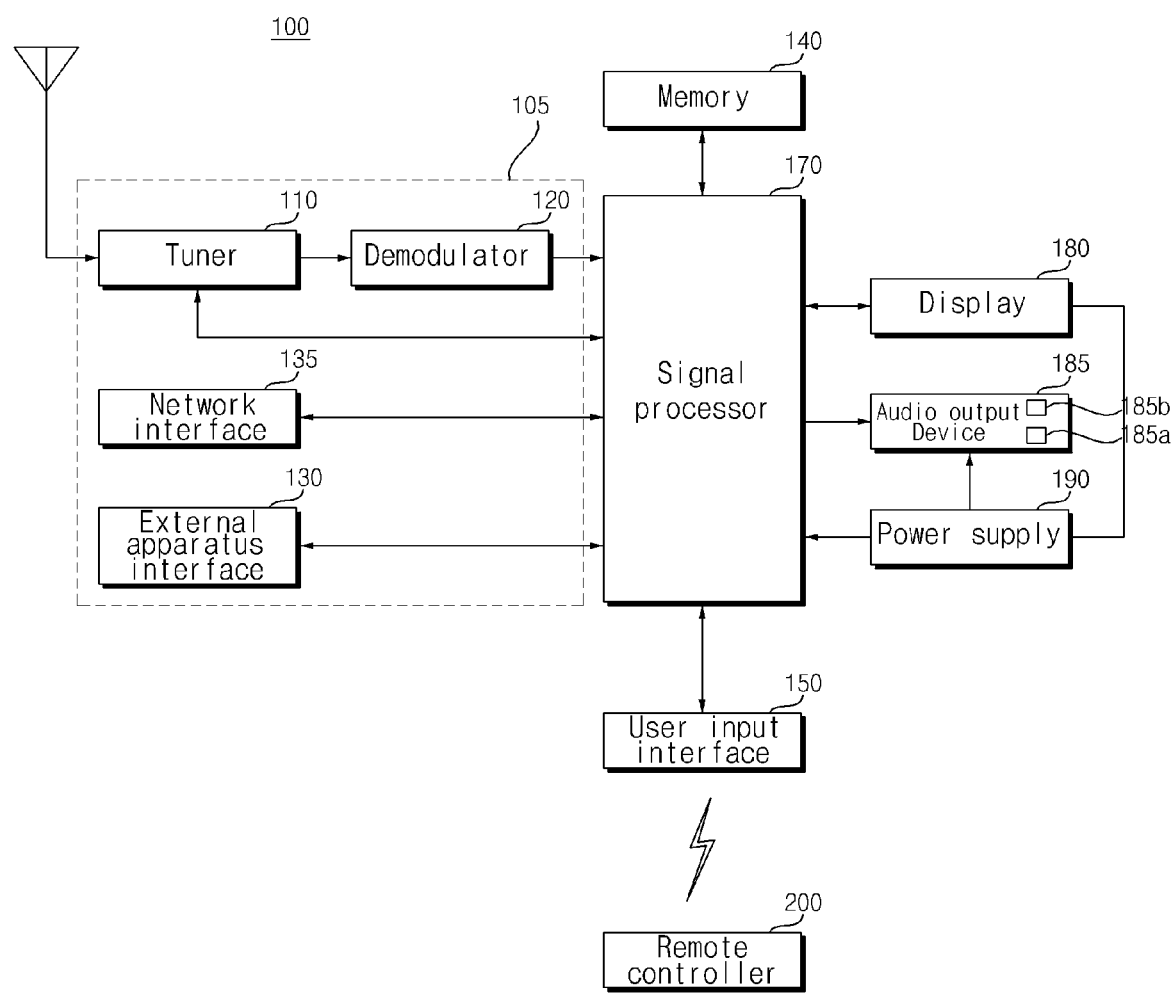
FIG. 2 is an internal block diagram of the image display apparatus of FIG. 1.

FIG. 2 is an internal block diagram of the image display apparatus of FIG. 1.

Referring to FIG. 2, the image display apparatus 100 according to an embodiment of the present disclosure may include a image receiver 105, an external device interface 130, a memory 140, a user input interface 150, a sensor device (not shown), a signal processing device 170, a display 180, and an audio output device 185.

The image receiver 105 may include a tuner 110, a demodulator 120, a network interface 135, and an external device interface 130.

Meanwhile, unlike the drawing, the image receiver 105 may include only the tuner 110, the demodulator 120, and the external device interface 130. That is, the image receiver 105 may not include the network interface 135.

The tuner 110 selects a radio frequency (RF) broadcast signal corresponding to a channel selected by a user or all prestored channels from among RF broadcast signals received through an antenna (not shown). In addition, the tuner 110 converts the selected RF broadcast signal into an intermediate frequency (IF) signal, a baseband image, or an audio signal.

To receive broadcast signals of a plurality of channels, a plurality of tuners 110 may be provided. Alternatively, a single tuner to receive broadcast signals of a plurality of channels simultaneously may be provided.

The demodulator 120 receives and demodulates the DIF signal converted by the tuner 110.

After performing demodulation and channel decoding, the demodulator 120 may output a transport stream (TS) signal. Herein, the stream signal may be a signal obtained by multiplexing an image signal, an audio signal, and a data signal.

The TS signal output from the demodulator 120 may be input to the signal processing device 170. After performing demultiplexing and image/audio signal processing, the signal processing device 170 outputs an image to the display 180 and audio to the audio output device 185.

The external device interface 130 may transmit or receive data to or from an external device connected thereto (not shown). To this end, the external device interface 130 may include an audio/video (A/V) input/output device (not shown).

The external device interface 130 may be connected to external devices such as a digital versatile disc (DVD), a Blu-ray player, a game console, a camera, a camcorder, a (notebook) computer, and a set-top box in a wired/wireless manner and perform input/output operations with external devices.

The A/V input/output device may receive image and audio signals from an external device. The wireless transceiver (not shown) may perform short-range wireless communication with other electronic devices.

By using the wireless transceiver (not shown), the external device interface 130 may exchange data with a neighboring mobile terminal. Specifically, the external device interface 130 may receive device information, information of an executed application, an application image, and the like, in a mirroring mode.

The network interface 135 provides an interface for connecting the image display apparatus 100 with a wired/wireless network including the Internet. For example, the network interface 135 may receive content or data provided by an Internet or content provider or a network operator over a network.

Meanwhile, the network interface 135 may include a wireless transceiver (not shown).

The memory 140 may store programs for processing and control of signals in the signal processing device 170 and also store a signal-processed image, audio, or data signal.

The memory 140 may function to temporarily store an image signal, an audio signal, or a data signal input through the external device interface 130. In addition, the memory 140 may store information about a predetermined broadcast channel through the channel memorization function such as a channel map.

While an embodiment in which the memory 140 is provided separately from the signal processing device 170 is illustrated in FIG. 2, embodiments of the present disclosure are not limited thereto. The memory 140 may be included in the signal processing device 170.

The user input interface 150 may transmit a signal input by a user to the signal processing device 170 or transmit a signal from the signal processing device 170 to the user.

For example, the user input interface 150 may transmit/receive user input signals such as power on/off, channel selection, and screen window setting to/from the remote control device 200 or transmit user input signals input through local keys (not shown) such as a power key, a channel key, a volume key, or a setting key to the signal processing device 170. The user input interface 150 may transmit user input signals input through a sensor device (not shown) to sense gesture of the user to the signal processing device 170 or transmit a signal from the signal processing device 170 to the sensor device (not shown).

The signal processing device 170 may demultiplex the TS signal input through the tuner 110, the demodulator 120, the network interface 135, or the external device interface 130 or process the demultiplexed signal to generate a signal for outputting an image or audio.

For example, the signal processing device 170 may receive a broadcasting signal or an HDMI signal received from the image receiver 105 and perform a signal processing based on the received broadcasting signal or HDMI signal to output the signal processed image signal.

The image signal processed by the signal processing device 170 may be input to the display 180 such that an image corresponding to the image signal may be displayed on the display. In addition, the image signal processed by the signal processing device 170 may be input to an external output device through the external device interface 130.

The audio signal processed by the signal processing device 170 may be output to the audio output device 185 in the form of sound. In addition, the audio signal processed by the signal processing device 170 may be input to an external output device through the external device interface 130.

Although not shown in FIG. 2, the signal processing device 170 may include a demultiplexer and an image processor. That is, the signal processing device 170 may perform various types of signal processing, and accordingly, may be implemented in a system on chip (SOC) format, which will be described with reference to FIG. 3 later.

Additionally, the signal processing device 170 may control an overall operation of the image display apparatus 100. For example, the signal processing device 170 may control the tuner 110 to tune to an RF broadcast corresponding to a channel selected by the user or a prestored channel.

The signal processing device 170 may control the image display apparatus 100 according to a user command input through the user input interface 150 or according to an internal program.

The signal processing device 170 may control the display 180 to display an image. Herein, the image displayed on the display 180 may be a still image, a moving image, a 2D image, or a 3D image.

The signal processing device 170 may control such that a predetermined object is displayed in an image displayed on the display 180. For example, the object may be at least one of an accessed web page (a newspaper, a magazine, etc.), an electronic program guide (EPG), various menus, a widget, an icon, a still image, a moving image, or text.

The signal processing device 170 may recognize the location of the user based on an image captured by a capture device (not shown). For example, the signal processing device 170 may recognize the distance between the user and the image display apparatus 100 (i.e., a z-axis coordinate). Additionally, the signal processing device 170 may recognize an x-axis coordinate and y-axis coordinate in the display 180, corresponding to the location of the user.

The display 180 generates drive signals by converting an image signal, a data signal, an on-screen display (OSD) signal, and a control signal processed by the signal processing device 170 or an image signal, a data signal, and a control signal received from the external device interface 130.

The display 180 may include a touchscreen and may function as an input device as well as an output device.

The audio output device 185 receives an audio signal processed by the signal processing device 170 and outputs audio.

A capture device (not shown) captures an image of the user. The capture device (not shown) may be implemented using one camera. However, embodiments of the present disclosure are not limited thereto and the capture device (not shown) may be implemented using a plurality of cameras. Information about the image captured by the capture device (not shown) may be input to the signal processing device 170.

The signal processing device 170 may sense user gestures based on the image captured by the capture device (not shown), the signal sensed by the sensor device (not shown), or a combination thereof.

The power supply 190 supplies power to overall parts of the image display apparatus 100. In particular, the power supply 190 may supply power to the signal processing device 170, which may be implemented in the form of system-on-chip (SOC), the display 180 for displaying images, and the audio output device 185 for outputting audio signals.

Specifically, the power supply 190 may include a converter for converting alternating current (AC) power into direct current (DC) power and a DC-DC converter for changing the level of the DC power.

The remote control device 200 transmits a user input signal to the user input interface 150. To this end, the remote control device 200 may use Bluetooth, RF communication, infrared (IR) communication, ultra-wideband (UWB), or ZigBee. In addition, the remote control device 200 may receive an image signal, an audio signal, or a data signal from the user input interface 150 and then display or audibly output the received signal.

The image display apparatus 100 may be a fixed or mobile digital image receiver capable of receiving a digital broadcast.

FIG. 2 is a block diagram of the image display apparatus 100 according to an embodiment of the present disclosure. Some of the constituents of the image display apparatus shown in the diagram may be combined or omitted or other constituents may be added thereto, according to specifications of the image display apparatus 100 as actually implemented. That is, two or more constituents of the image display apparatus 100 may be combined into one constituent or one constituent thereof may be subdivided into two or more constituents, as needed. In addition, a function performed in each block is simply illustrative and specific operations or units of the block do not limit the scope of the present disclosure.

Figure 3:
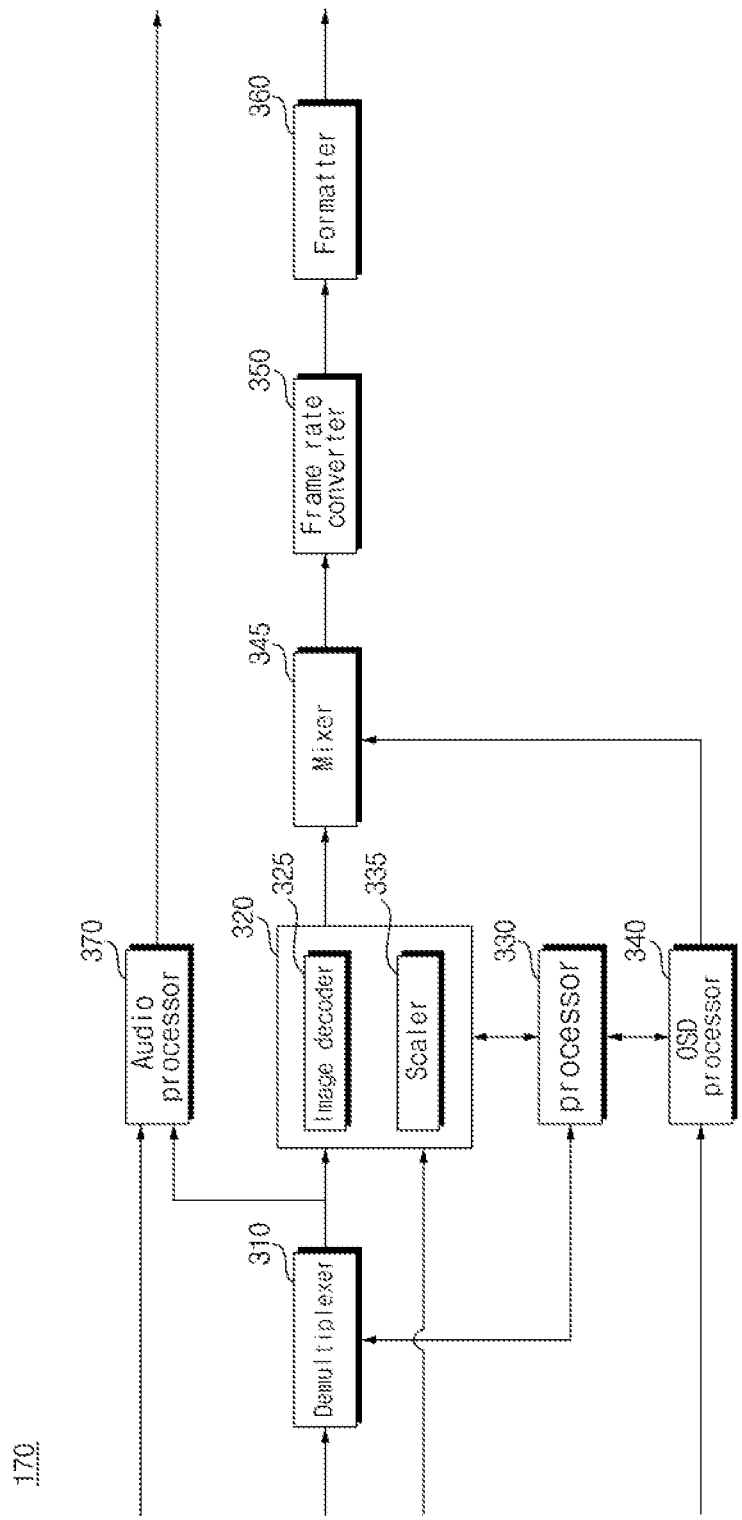
FIG. 3 is an internal block diagram of a controller of the image display apparatus of FIG. 2.

FIG. 3 is an internal block diagram of the controller shown in FIG. 2.

Referring to FIG. 3, the signal processing device 170 according to an embodiment of the present disclosure may include a demultiplexer 310, an image processor 320, a processor 330, and an audio processor 370. The signal processing device 170 may further include a data processor (not shown).

The demultiplexer 310 demultiplexes an input TS signal. For example, when an MPEG-2 TS signal is input, the demultiplexer 310 may demultiplex the MPEG-2 TS signal into an image signal, an audio signal, and a data signal. Herein, the TS signal input to the demultiplexer 310 may be a TS signal output from the tuner 110, the demodulator 120, or the external device interface 130.

The image processor 320 may perform signal processing on the input image signal. For example, the image processor 320 may perform image processing on the demultiplexed image signal from the demultiplexer 310.

To this end, the image processor 320 may include an image decoder 325, a scaler 335, an image quality processor 635, an image encoder (not shown), an OSD processor 340, a frame rate converter 350, and a formatter 360.

The image decoder 325 decodes the demultiplexed image signal, and the scaler 335 scales the resolution of the decoded image signal for outputting the image signal through the display 180.

The video decoder 325 may be provided with decoders that operate in conformance to various standards. For example, the video decoder 325 may include, for example, an MPEG-2 decoder, an H.264 decoder, a 3D video decoder for a color image a depth image, a decoder for multi-view images, and so on.

The scaler 335 may scale a received image signal which is decoded by the image decoder 325.

For example, when the size or resolution of a received image signal is small and low, the scaler 335 may upscale the received image signal. When the size or resolution of a received image signal is great and high, the scaler 335 may downscale the received image signal.

The image quality processor 635 may perform image quality processing based on a received image signal which is decoded by the image decoder 325.

For example, the image quality processor 635 may reduce noise of a received image signal, extend grayscale of the received image signal, enhance image resolution, perform High Dynamic Range (HDR)-based signal processing, change a frame rate, or perform image quality processing to corresponding to characteristics of a panel, especially, an organic light emitting panel.

The OSD processor 340 generates an OSD signal autonomously or according to a user input signal. For example, the OSD processor 340 may generate a signal for displaying a variety of information in the form of graphics or texts on the screen of the display 180 based on a user input signal. The generated OSD signal may include a variety of data such as a user interface screen, various menu screens, a widget, and an icon of the image display apparatus 100. The generated OSD signal may also include a 2D object or a 3D object.

The OSD processor 340 may generate a pointer which can be displayed on the display, based on a pointing signal input from the remote control device 200. In particular, the pointer may be generated by a pointing signal processor (not shown) and the OSD processor 240 may include the pointing signal generator (not shown). Obviously, it is possible to provide the pointing signal processor (not shown) separately from the OSD processor 240.

The frame rate converter (FRC) 350 may convert the frame rate of an input image. The FRC 350 may also directly output the input image without frame rate conversion.

The formatter 360 may change the format of a received image signal to an image signal to be displayed on the display.

Particularly, the formatter 360 may change the format of a received image signal to correspond to characteristics of a display panel.

The processor 330 may control overall operations in the image display apparatus 100 or the signal processor 170.

For example, the processor 330 may control the tuner unit 110 to tune to an RF broadcast signal corresponding to a user-selected channel or a pre-stored channel.

The processor 330 may control the image display apparatus 100 according to a user command received through the user input interface 150 or according to an internal program.

In addition, the processor 330 may control data transmission through the network interface 135 or the external device interface 130.

In addition, the processor 330 may control operations of the demultiplexer 310 and the image processor 320 in the signal processor 170.

An audio processor 370 in the signal processing device 170 may process the demultiplexed audio signal. To this end, the audio processor 370 may include various decoders.

The audio processor 370 in the signal processing device 170 may perform processing such as adjustment of bass, treble, and volume.

The data processor (not shown) in the signal processing device 170 may perform data processing on the demultiplexed data signal. For example, if the demultiplexed data signal is a coded data signal, the data processor (not shown) may decode the data signal. The coded data signal may be EPG information containing broadcast information such as a start time and end time of a broadcast program broadcast on each channel.

The block diagram of the signal processing device 170 shown in FIG. 3 is simply illustrative. Constituents of the block diagram may be integrated, added or omitted according to the specifications of the signal processing device 170 as actually implemented.

In particular, the frame rate converter 350 and the formatter 360 may be provided separately from the image processor 320.

Figure 4A:
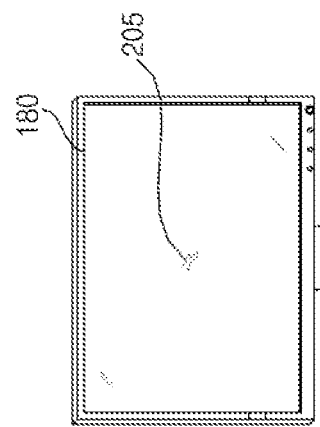
FIG. 4A is a view illustrating a method of controlling a remote control device of the image display apparatus of FIG. 2.
Figure 4A:
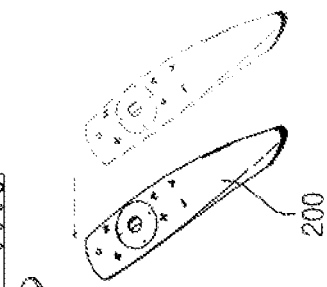
Figure 4A:
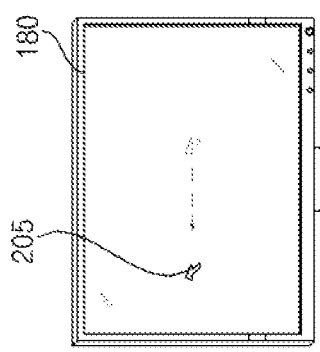
Figure 4A:
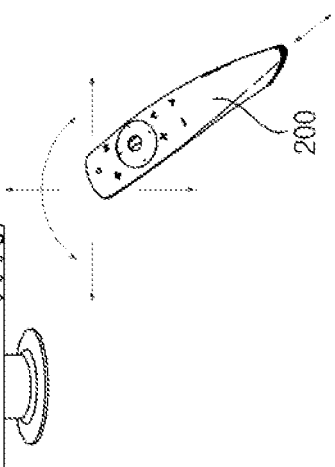

FIG. 4A is a view illustrating a method of controlling the remote control device shown in FIG. 2.

As shown in FIG. 4A(a), a pointer 205 corresponding to the remote control device 200 may be displayed on the display 180.

A user may move the remote control device 200 up and down, left and right (FIG. 4A(b)), or back and forth (FIG. 4A(c)) or rotate the same. The pointer 205 displayed on the display 180 of the image display apparatus moves according to movement of the remote control device 200. As shown in the figure, since the pointer 205 moves according to movement of the remote control device 200 in a 3D space, the remote control device 200 may be referred to as a spatial remote control device or a 3D pointing device.

FIG. 4A(b) illustrates a case in which the pointer 205 displayed on the display 180 moves to the left when the user moves the remote control device 200 to the left.

Information about movement of the remote control device 200 sensed through a sensor of the remote control device 200 is transmitted to the image display apparatus. The image display apparatus may calculate coordinates of the pointer 205 based on the information about the movement of the remote control device 200. The image display apparatus may display the pointer 205 such that the pointer 205 corresponds to the calculated coordinates.

FIG. 4A(c) illustrates a case in which the user moves the remote control device 200 away from display 180 while pressing down a specific button on the remote control device 200. In this case, a selected area on the display 180 corresponding to the pointer 205 may be zoomed in and displayed with a magnified size. On the contrary, when the user moves the remote control device 200 closer to the display 180, the selected area may be zoomed out and displayed with a reduced size. Alternatively, the selected area may be zoomed out when the remote control device 200 is moved away from the display 180 and may be zoomed in when the remote control device 200 is moved closer to the display 180.

Up-and-down and left-and-right movements of the remote control device 200 may not be recognized while the specific button on the remote control device 200 is pressed down. That is, when the remote control device 200 moves away from the display 180 or approaches the display 180, the up-and-down and left-and-right movements of the remote control device 200 may not be recognized and only a back-and-forth movement of the remote control device 200 may be recognized. If the specific button on the remote control device 200 is not pressed down, only the pointer 205 moves according to the up-and-down and left-and-right movements of the remote control device 200.

The speed and direction of movement of the pointer 205 may correspond to the speed and direction of movement of the remote control device 200.

Figure 4B:
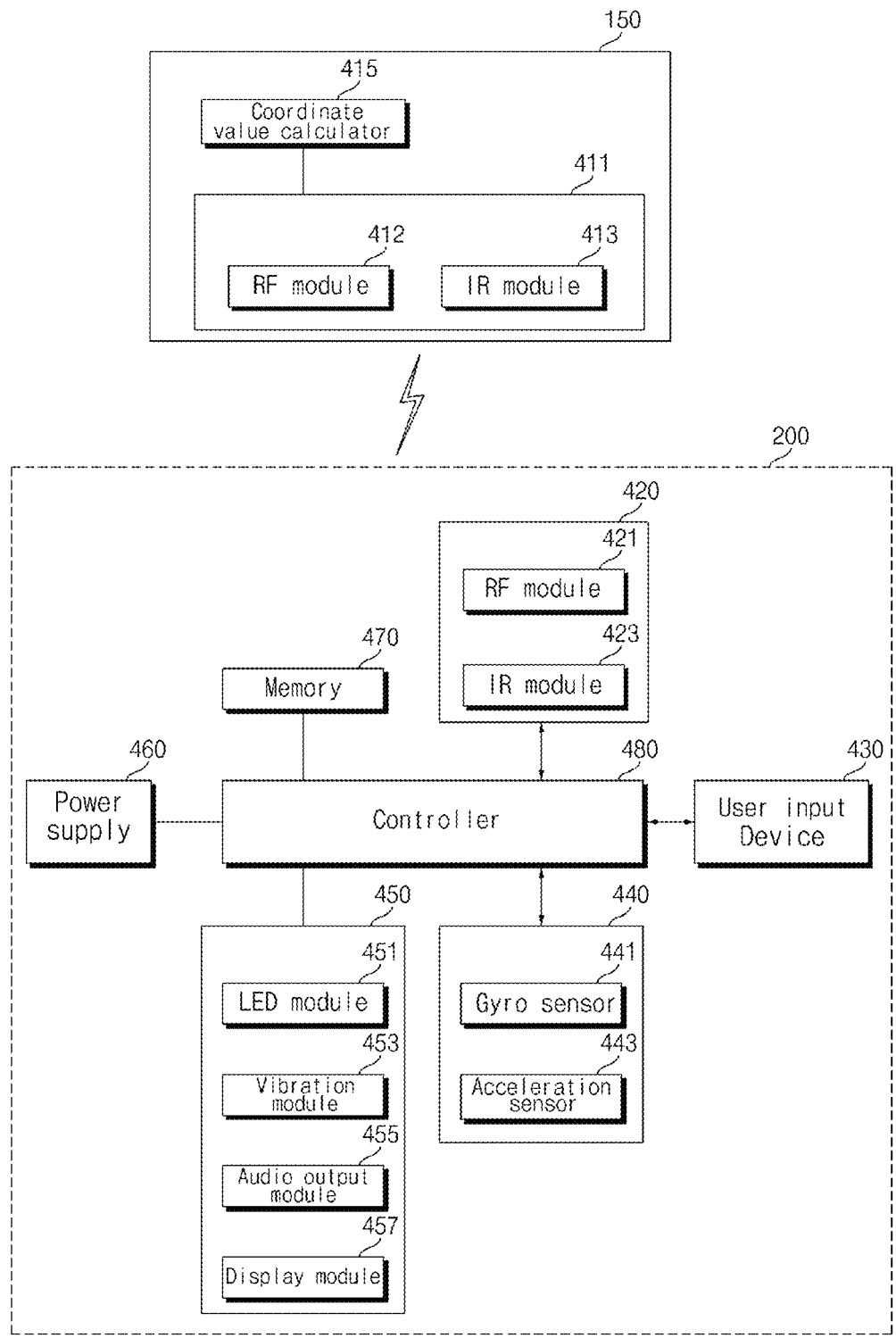
FIG. 4B is an internal block diagram of the remote control device of the image display apparatus of FIG. 2.

FIG. 4B is an internal block diagram of the remote control device shown in FIG. 2.

Referring to FIG. 4B, the remote control device 200 may include a wireless transceiver 420, a user input interface 430, a sensor device 440, an output device 450, a power supply 460, a memory 470, and a controller 480.

The wireless transceiver 420 transmits and receives signals to and from one of the image display apparatuses according to embodiments of the present disclosure described above. Hereinafter, one image display apparatus 100 among the image display apparatuses according to embodiments of the present disclosure will be described by way of example.

In this embodiment, the wireless transceiver 420 may include an RF module 421 capable of transmitting and receiving signals to and from the image display apparatus 100 according to an RF communication standard. The wireless transceiver 420 may further include an IR module 423 capable of transmitting and receiving signals to and from the image display apparatus 100 according to an IR communication standard.

In this embodiment, the remote control device 200 transmits a signal containing information about movement of the remote control device 200 to the image display apparatus 100 via the RF module 421.

In addition, the remote control device 200 may receive a signal from the image display apparatus 100 via the RF module 421. As needed, the remote control device 200 may transmit commands related to power on/off, channel change, and volume change to the image display apparatus 100 via the IR module 423.

The user input interface 430 may include a keypad, buttons, a touchpad, or a touchscreen. The user may input a command related to the display apparatus 100 to the remote control device 200 by manipulating the user input interface 430. If the user input interface 430 includes a hard key button, the user may input a command related to the image display apparatus 100 to the remote control device 200 by pressing the hard key button. If the user input interface 430 includes a touchscreen, the user may input a command related to the image display apparatus 100 to the remote control device 200 by touching a soft key on the touchscreen. The user input interface 430 may include various types of input means such as a scroll key and a jog key which can be manipulated by the user and this embodiment does not limit the scope of the present disclosure.

The sensor device 440 may include a gyro sensor 441 or an acceleration sensor 443. The gyro sensor 441 may sense information about movement of the remote control device 200.

For example, the gyro sensor 441 may sense information about movement of the remote control device 200 with respect to the X, Y and Z axes. The acceleration sensor 443 may sense information about the movement speed of the remote control device 200. The sensor device 440 may further include a distance measurement sensor to sense a distance to the display 180.

The output device 450 may output an image signal or audio signal corresponding to manipulation of the user input interface 435 or the signal transmitted by the image display apparatus 100. The user may recognize, via the output device 450, whether the user input interface 435 is manipulated or the image display apparatus 100 is controlled.

For example, the output device 450 may include an LED module 451 to be turned on, a vibration module 453 to generate vibration, a sound output module 455 to output sound, or a display module 457 to output an image, when the user input interface 435 is manipulated or signals are transmitted to and received from the image display apparatus 100 via the wireless transceiver 425.

The power supply 460 supplies power to the remote control device 200. If the remote control device 200 does not move for a predetermined time, the power supply 460 may stop supplying power to reduce waste of power. The power supply 460 may resume supply of power when a predetermined key provided to the remote control device 200 is manipulated.

The memory 470 may store various types of programs and application data necessary for control or operation of the remote control device 200. When the remote control device 200 wirelessly transmits and receives signals to and from the image display apparatus 100 via the RF module 421, the remote control device 200 and the image display apparatus 100 may transmit and receive signals in a predetermined frequency band. The controller 480 of the remote control device 200 may store, in the memory 470, information about a frequency band enabling wireless transmission and reception of signals to and from the image display apparatus 100 which is paired with the remote control device 200, and reference the information.

The controller 480 controls overall operation related to control of the remote control device 200. The controller 480 may transmit a signal corresponding to manipulation of a predetermined key in the user input interface 435 or a signal corresponding to movement of the remote control device 200 sensed by the sensor device 440 to the image display apparatus 100 via the wireless transceiver 420.

The user input interface 150 of the image display apparatus 100 may include a wireless transceiver 411 capable of wirelessly transmitting and receiving signals to and from the remote control device 200 and a coordinate calculator 415 capable of calculating coordinates of a pointer corresponding to operation of the remote control device 200.

The user input interface 150 may wirelessly transmit and receive signals to and from the remote control device 200 via an RF module 412. In addition, the user input interface 150 may receive, via an IR module 413, a signal transmitted from the remote control device 200 according to an IR communication standard.

The coordinate calculator 415 may calculate a coordinate value (x, y) of the pointer 205 to be displayed on the display 180 by correcting hand shaking or errors in a signal corresponding to operation of the remote control device 200, which is received via the wireless transceiver 411.

The signal which is transmitted by the remote control device 200 and input to the image display apparatus 100 via the user input interface 150 is transmitted to the signal processing device 170 of the image display apparatus 100. The signal processing device 170 may determine information about an operation of the remote control device 200 or manipulation of a key from the signal transmitted by the remote control device 200 and control the image display apparatus 100 based on the information.

As another example, the remote control device 200 may calculate a coordinate value of a pointer corresponding to movement thereof and output the coordinate value to the user input interface 150 of the image display apparatus 100. In this case, the user input interface 150 of the image display apparatus 100 may transmit, to the signal processing device 170, information about the received coordinate value of the pointer without separately correcting hand tremor or errors.

As another example, the coordinate calculator 415 may be provided in the signal processing device 170 rather than in the user input interface 150 as opposed to FIG. 4B.

Figure 5:
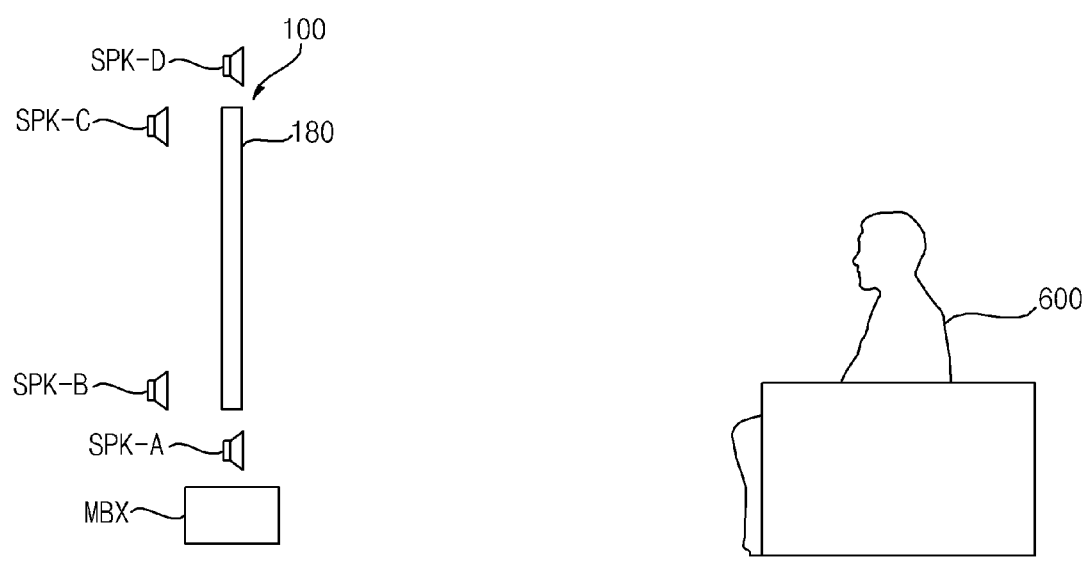
FIG. 5 is a diagram referenced to describe the image display system shown in FIG. 1.

FIG. 5 is a diagram referenced to describe the image display system shown in FIG. 1.

Referring to FIG. 5, based on display 180 of the image display device 100 of the image system 10 according to the present disclosure, among the plurality of wireless sound output devices SPK-A to SPK-D, the first wireless sound output device SPK-A may be a front wireless speaker, the second and third wireless sound output devices SPK-B and SPK-C may be a left wireless speaker and a right wireless speaker, respectively, and the fourth sound output device SPK-D may be a rear wireless speaker.

Accordingly, a user 600 may watch images using the display 180 and also listen to the front sound, the left sound, the right sound, and the rear sound through the plurality of wireless sound output devices SPK-A to SPK-D.

Figure 6A:
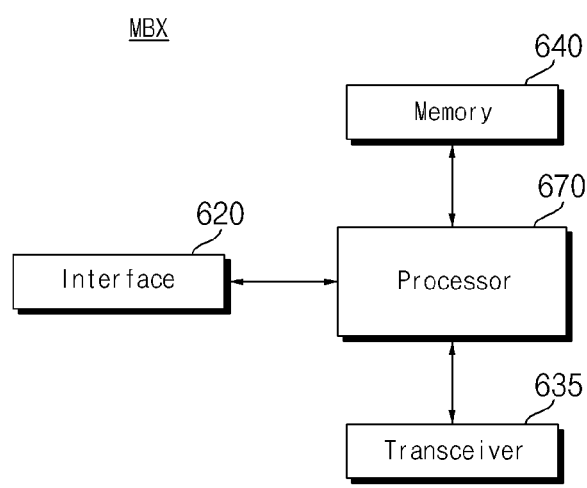
FIG. 6A is an example of a block diagram of a wireless audio transmission device in the wireless audio system shown in FIG. 1.

FIG. 6A is an example of a block diagram of a wireless audio transmission device in the wireless audio system shown in FIG. 1.

Referring to FIG. 6A, the wireless audio transmission device MBX according to an embodiment of the present disclosure may include an interface 620, a memory 640, a transceiver 635, and a processor 670.

The interface 620 may receive an image signal or an audio signal from a connected external device (e.g., a set top box).

The memory 640 may store the program for signal processing and control in the wireless audio transmission device MBX and store the signal processed image signal or audio signal.

The transceiver 635 may perform wireless communication and perform wireless communication with the external image display device 100 or the external plurality of wireless sound output devices SPK-A to SPK-D.

For example, the transceiver 635 may transmit an audio signal to the plurality of wireless sound output devices SPK-A to SPK-D through Wi-Fi communication.

In the case that the wireless audio transmission device MBX is in the access point mode, and the plurality of wireless sound output devices SPK-A to SPK-D is in the station mode, the transceiver 635 may transmit a synchronization request message to the plurality of wireless sound output devices SPK-A to SPK-D wirelessly, and receive a synchronization response message from at least one of the plurality of wireless sound output devices SPK-A to SPK-D wirelessly.

Meanwhile, after receiving the synchronization response message, in the case that the wireless audio transmission device MBX is in the station mode, and the first wireless sound output device SPK-A is in the access point mode among the plurality of wireless sound output devices SPK-A to SPK-D, the transceiver 635 may receive a second synchronization request message from the first wireless sound output device SPK-A wirelessly and transmit a second synchronization response message to the first wireless sound output device SPK-A wirelessly.

The transceiver 635 may transmit an audio packet including playback time information, which is predetermined based on the time offset, to each of the wireless sound output devices SPK-A to SPK-D wirelessly.

Meanwhile, the transceiver 635 may receive information regarding the second synchronization response message for at least some of the plurality of wireless sound output devices SPK-A to SPK-D received from the first wireless sound output device SPK-A wirelessly.

The transceiver 635 may transmit an audio packet including playback time information, which is predetermined based on the time offset, to each of the wireless sound output devices SPK-A to SPK-D wirelessly.

The processor 670 may control each unit in the wireless audio transmission device MBX. Specifically, the processor 670 may control the transceiver 635.

For example, the processor 670 may signal processing of the audio signal received from the exterior and control such that the signal processed audio signal is transmitted to the plurality of wireless sound output devices SPK-A to SPK-D.

Meanwhile, in a state in which the processor 670 receives a synchronization response message from at least one of the plurality of wireless sound output devices SPK-A to SPK-D, based on the received synchronization response message, in the case that the calculation of the time offset for the plurality of wireless sound output devices SPK-A to SPK-D is not completed, the processor 670 may control the wireless audio transmission device MBX to be switched from the access point mode to the station mode. Accordingly, switching between the access point and the station mode is available selectively, and consequently, the synchronization error can be reduced between the wireless audio transmission device MBX and the plurality of wireless sound output devices SPK-A to SPK-D.

In a state in which the processor 670 receives a synchronization response message from at least one of the plurality of wireless sound output devices SPK-A to SPK-D, based on the received synchronization response message, in the case that the calculation of the time offset for the plurality of wireless sound output devices SPK-A to SPK-D is completed, the processor 670 may control such that the audio signal corresponding to the predetermined time offset is transmitted to the plurality of wireless sound output devices SPK-A to SPK-D, respectively. Accordingly, the synchronization error can be reduced between the wireless audio transmission device MBX and the plurality of wireless sound output devices SPK-A to SPK-D.

Meanwhile, based on the information regarding the second synchronization response message for at least some of the plurality of wireless sound output devices SPK-A to SPK-D, in the case that the calculation of the time offset for the plurality of wireless sound output devices SPK-A to SPK-D is completed, the processor 670 may perform control such that the audio signal corresponding to the predetermined time offset is transmitted to the plurality of wireless sound output devices SPK-A to SPK-D, respectively.

Although it is not shown in the drawing, the wireless audio transmission device MBX may operate as a woofer. Accordingly, the wireless audio transmission device MBX may further include an audio output device (not shown).

Figure 6B:
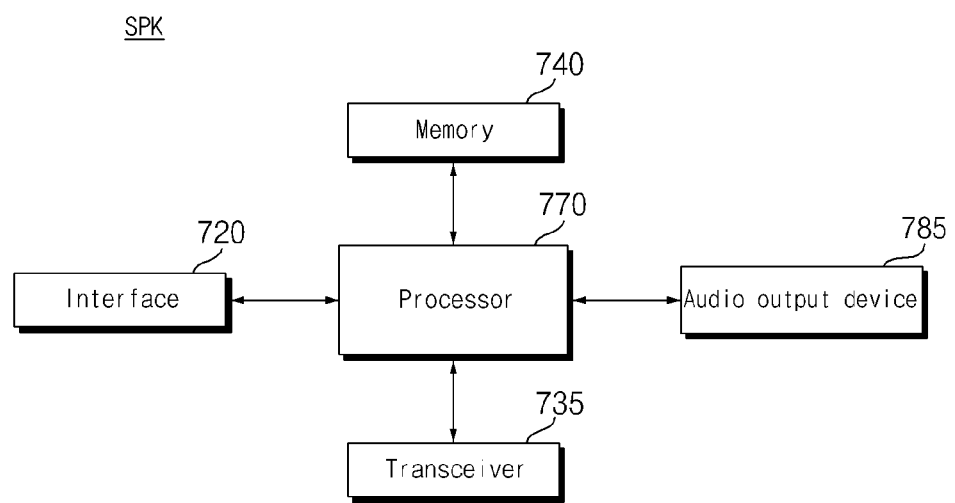
FIG. 6B is an example of a block diagram of a wireless audio transmission device in the wireless audio system shown in FIG. 1.

FIG. 6B is an example of a block diagram of a wireless audio transmission device in the wireless audio system shown in FIG. 1.

Referring to FIG. 6A, each SPK of the plurality of wireless sound output devices SPK-A to SPK-D according to an embodiment of the present disclosure may include an interface 720, a memory 740, a transceiver 735, a processor 770, and an audio output device 785.

The interface 720 may receive power or data from a connected external device.

The memory 740 may store the program for signal processing and perform control in the wireless sound output device SPK and store the signal processed image signal or audio signal.

The transceiver 735 may perform wireless communication and perform wireless communication with the wireless audio transmission device MBX or the external plurality of wireless sound output devices SPK-A to SPK-D.

For example, the transceiver 735 may receive an audio signal to the wireless audio transmission device MBX through Wi-Fi communication.

For another example, the transceiver 735 may transmit data to another wireless sound output devices SPK-A to SPK-D or receive data therefrom.

In the case that the wireless audio transmission device MBX is in the access point mode, and the wireless sound output device is in the station mode, the transceiver 735 may receive a synchronization request message from the wireless audio transmission device MBX wirelessly, and in response to the synchronization request message, may transmit a synchronization response message wirelessly.

Meanwhile, after receiving the synchronization response message, in the case that the wireless audio transmission device MBX is in the station mode, and the wireless sound output device is switched to the access point mode, the transceiver 735 may transmit a second synchronization request message to the wireless audio transmission device MBX and the plurality of wireless sound output devices SPK-A to SPK-D, and in response to the second synchronization request message, may receive a second synchronization response message from the wireless audio transmission device MBX and at least some of the plurality of wireless sound output devices SPK-A to SPK-D.

Meanwhile, the transceiver 735 may transmit information regarding the second synchronization response message received from at least some of the plurality of wireless sound output devices SPK-A to SPK-D to the wireless audio transmission device MBX wirelessly.

The transceiver 735 may receive an audio signal corresponding to the time offset, which is configured from the wireless audio transmission device MBX.

Accordingly, in response to the predetermined time offset, the audio output device 785 may output the corresponding sound.

The transceiver 735 may receive an audio packet including playback time information, which is predetermined from the wireless audio transmission device MBX, wirelessly.

Accordingly, in response to the configured playback time information, the audio output device 785 may output the sound that corresponds to the audio packet.

Figure 7A:
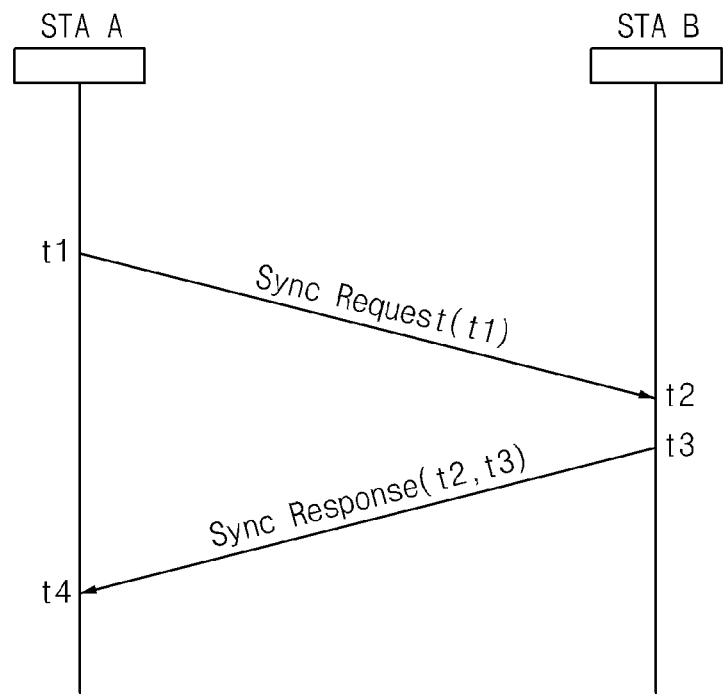
FIGS. 7A and 7B are diagrams referred to describe a wireless system in relation to the present disclosure.
Figure 7B:
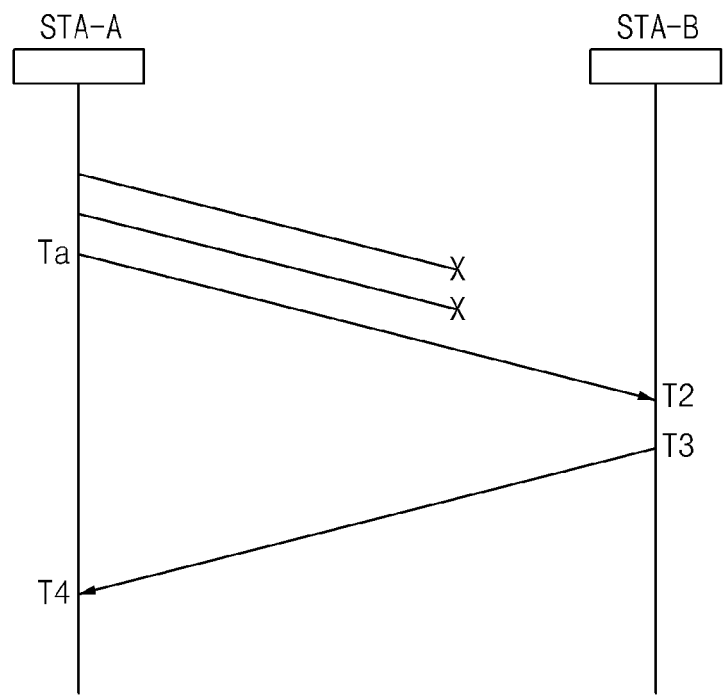

Reference is made to diagrams in FIGS. 7A and 7B to describe a wireless system in relation to the present disclosure.

FIG. 7A is a diagram illustrating an example of an operation of a signal transmission device and a signal reception device.

The signal transmission device (STA A) and the signal reception device (STA B) shown in FIG. 7A may correspond to prior art document 1 described above.

Referring to FIG. 7A, the signal transmission device STA A transmits a synchronization request message, at time t1, the signal reception device STA B receives the synchronization request message, at time t2, the signal transmission device STA A transmits a synchronization response message, at time t3, and the signal receiving device STA B, at time t4, receives the synchronization response message.

Accordingly, a clock offset between the signal transmission device STA A and the signal reception device STA B is computed for $\{(t2-t1)-(t4-t4)\}/2$.

FIG. 7B is a diagram illustrating another example of an operation of the signal transmission device STA A and the signal reception device STA B.

Referring to FIG. 7B, the signal transmission device STA A transmits a synchronization request message, on t1 time, but the signal reception device STA B may not receive the message.

Accordingly, the signal transmission device STA A transmits the synchronization request message again, but the signal reception device STA B may not receive the message.

The signal transmission device STA A transmits a synchronization request message, at time ta, which is a considerable time after time t1, the signal reception device STA B receives the synchronization request message, at time t2, the signal transmission device STA A transmits a synchronization response message, at time t3, and the signal receiving device STA B, at time t4, receives the synchronization response message.

As shown in FIG. 7B, in the case that the synchronization request message transmitted from the signal transmission device STA A is unable to be received by the signal receiving device STA B, the synchronization request message needs to be retransmitted after a predetermined time, and accordingly, a problem occurs that the synchronization error increases.

Accordingly, the present disclosure proposes a method of reducing the synchronization error in the wireless sound output system 300.

Particularly, the wireless audio transmission device MBX in the wireless sound output system 300 according to an embodiment of the present disclosure performs a calculation of a time offset of each of the wireless sound output devices SPK-A to SPK-D, and for this, switches the access point mode and the station mode. This will be described in more detail with reference to FIG. 8 and the following drawings.

Figure 8:
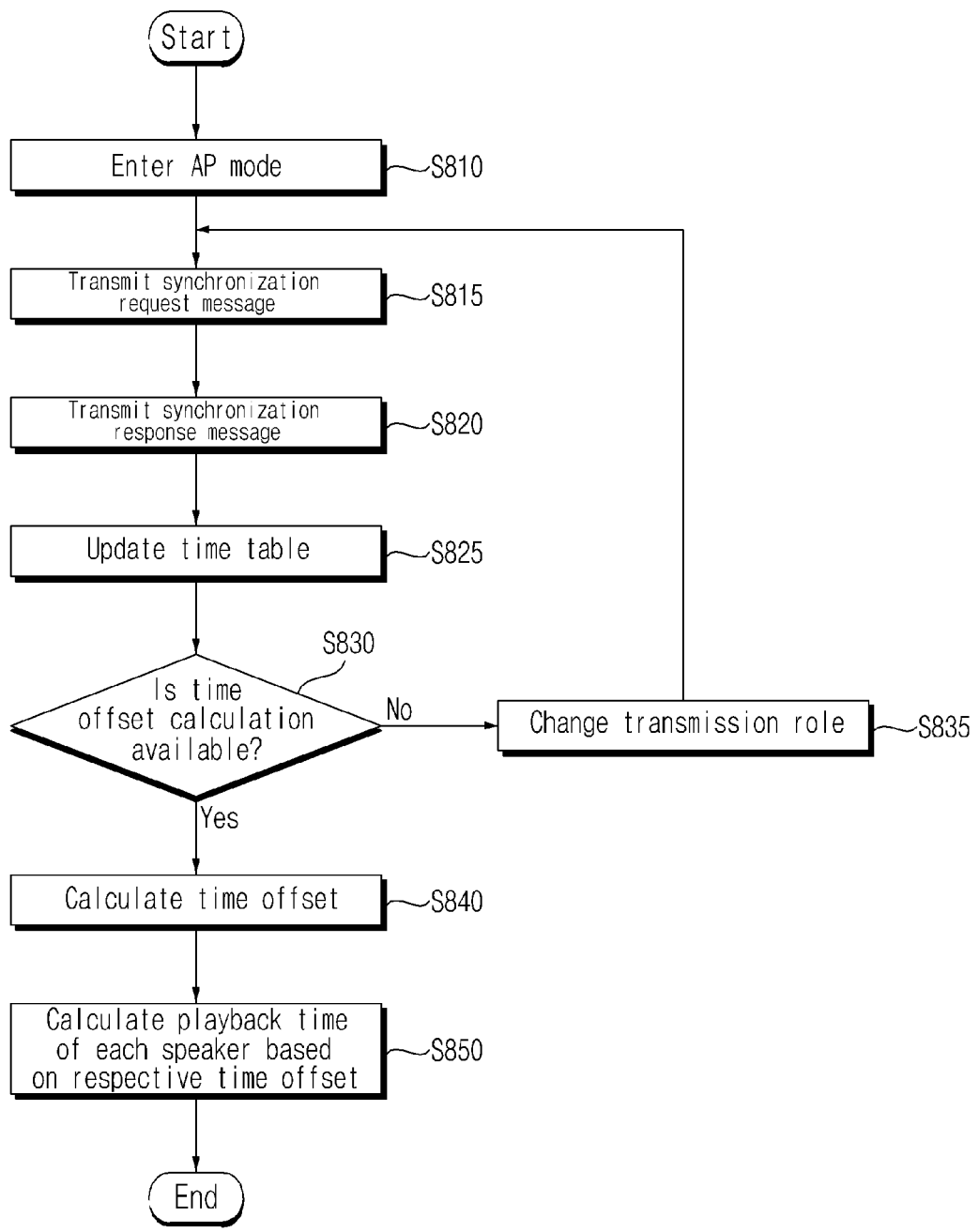
FIG. 8 is a flowchart illustrating an operation method of a wireless audio system according to an embodiment of the present disclosure.

FIG. 8 is a flowchart illustrating an operation method of a wireless audio system according to an embodiment of the present disclosure.

Referring to FIG. 8, the wireless audio transmission device MBX in the wireless sound output system 300 according to an embodiment of the present disclosure enters the access point (AP) mode to calculate the time offset of each of the wireless sound output devices SPK-A to SPK-D (step S810).

Thereafter, in the case that the wireless audio transmission device MBX is in the access point mode and the plurality of wireless sound output devices SPK-A to SPK-D is in the station mode, the transceiver 635 of the wireless audio transmission device MBX transmits a synchronization request message to the plurality of wireless sound output devices SPK-A to SPK-D wirelessly (step S815).

Next, the transceiver 635 of the wireless audio transmission device MBX receives a synchronization response message from at least one of the plurality of wireless sound output devices SPK-A to SPK-D wirelessly (step S820).

It is preferable that the transceiver 635 of the wireless audio transmission device MBX receives the synchronization response message from all the plurality of wireless sound output devices SPK-A to SPK-D wirelessly.

However, depending on the communication environment, the transceiver 635 of the wireless audio transmission device MBX may not receive the synchronization response message from some of the plurality of wireless sound output devices SPK-A to SPK-D wirelessly.

Meanwhile, the synchronization request message may include a broadcast message, and the synchronization response message may include a unicast message.

Meanwhile, the synchronization request message may include a Wi-Fi broadcast message.

Thereafter, the processor 670 of the wireless audio transmission device MBX may update a time table in the state of receiving the synchronization response message from at least one of the plurality of wireless sound output devices SPK-A to SPK-D (step S825).

The time table may include a sequence number of the synchronization response message and local time information of receiving the synchronization response message.

Next, the processor 670 of the wireless audio transmission device MBX determines whether a time offset calculation for the plurality of wireless sound output devices SPK-A to SPK-D is available based on the updated time table (step S830).

If the calculation is available, the processor 670 of the wireless audio transmission device MBX calculates the respective time offsets for the plurality of wireless sound output devices SPK-A to SPK-D (step S840).

In addition, the processor 670 of the wireless audio transmission device MBX may calculate playback time information of each of the wireless sound output devices SPK-A to SPK-D based on the respective time offset (step S850).

Furthermore, the transceiver 635 of the wireless audio transmission device MBX may transmit an audio packet including the configured playback time information wirelessly to each of the wireless sound output devices SPK-A to SPK-D.

Accordingly, each of the wireless sound output devices SPK-A to SPK-D may playback the received audio signal based on the configured playback time information and output the corresponding sound. Therefore, the synchronized sound may be output among the plurality of wireless sound output devices SPK-A to SPK-D.

Meanwhile, in step S830, if the time offset calculation is unavailable, the step 835 (step S835) is performed.

That is, according to the step 835 (step S835), the transmission role may be changed or switched between the wireless audio transmission device MBX and at least one of the plurality of wireless sound output devices SPK-A to SPK-D.

For example, if the time offset calculation is unavailable, the wireless audio transmission device MBX is switched from the access point mode to the station mode, among the plurality of wireless sound output devices SPK-A to SPK-D, the first sound output device SPK-A is switched from the station mode to the access point mode, and the second to fourth wireless sound output devices SPK-B to SPK-D may maintain the station mode without any change.

In addition, after the transmission role, similar to the step 815 (step S815), the transceiver 735 of the first sound output device SPK-A transmits a second synchronization request message to the wireless audio transmission device MBX and the remaining wireless sound output devices SPK-B to SPK-D wirelessly.

Thereafter, similar to the step 820 (step S820), the transceiver 735 of the first sound output device SPK-A receives a second synchronization response message from the wireless audio transmission device MBX and at least one of the remaining wireless sound output devices SPK-B to SPK-D wirelessly.

Furthermore, the transceiver 735 of the first sound output device SPK-A may transmit the information regarding the second synchronization response message received from at least some of the plurality of wireless sound output devices SPK-A to SPK-D to the wireless audio transmission device MBX wirelessly.

Next, similar to step 825 (S825), the processor 670 of the wireless audio transmission device MBX may update the time table based on receiving information on the second synchronization response message from the first wireless sound output device SPK-A.

Next, the processor 670 of the wireless audio transmission device MBX determines whether a time offset calculation for the plurality of wireless sound output devices SPK-A to SPK-D is available again based on the updated time table, similar to the step 830 (step S830).

If the calculation is available, similar to the step 840 (step S840), the processor 670 of the wireless audio transmission device MBX calculates the respective time offsets for the plurality of wireless sound output devices SPK-A to SPK-D.

In addition, similar to the step 850 (step S850), the processor 670 of the wireless audio transmission device MBX may calculate playback time information of each of the wireless sound output devices SPK-A to SPK-D based on the respective time offset.

Furthermore, the transceiver 635 of the wireless audio transmission device MBX may transmit an audio packet including the configured playback time information wirelessly to each of the wireless sound output devices SPK-A to SPK-D.

Accordingly, each of the wireless sound output devices SPK-A to SPK-D may playback the received audio signal based on the configured playback time information and output the corresponding sound. Therefore, the synchronized sound may be output among the plurality of wireless sound output devices SPK-A to SPK-D.

As such, according to the mode switching between the wireless audio transmission device MBX and the plurality of wireless sound output devices SPK-A to SPK-D, the time offset may be calculated quickly. Therefore, the synchronization error can be reduced between the wireless audio transmission device MBX and the plurality of wireless sound output devices SPK-A to SPK-D.

Particularly, the wireless sound output system 300 may be implemented universally through a switch between the access point mode and the station mode, without periodic message transmission.

Meanwhile, if the time offset calculation is unavailable in the state of receiving the information regarding the second synchronization response message, similar to the step 835 (step S835), the transmission role may be changed again, and accordingly, the second wireless sound output device SPK-B may be switched to the access point mode, and the remaining devices may be switched to the station mode.

Reference is made to diagrams in FIGS. 9 to 11C to describe the operation shown in FIG. 8.

Figure 9:
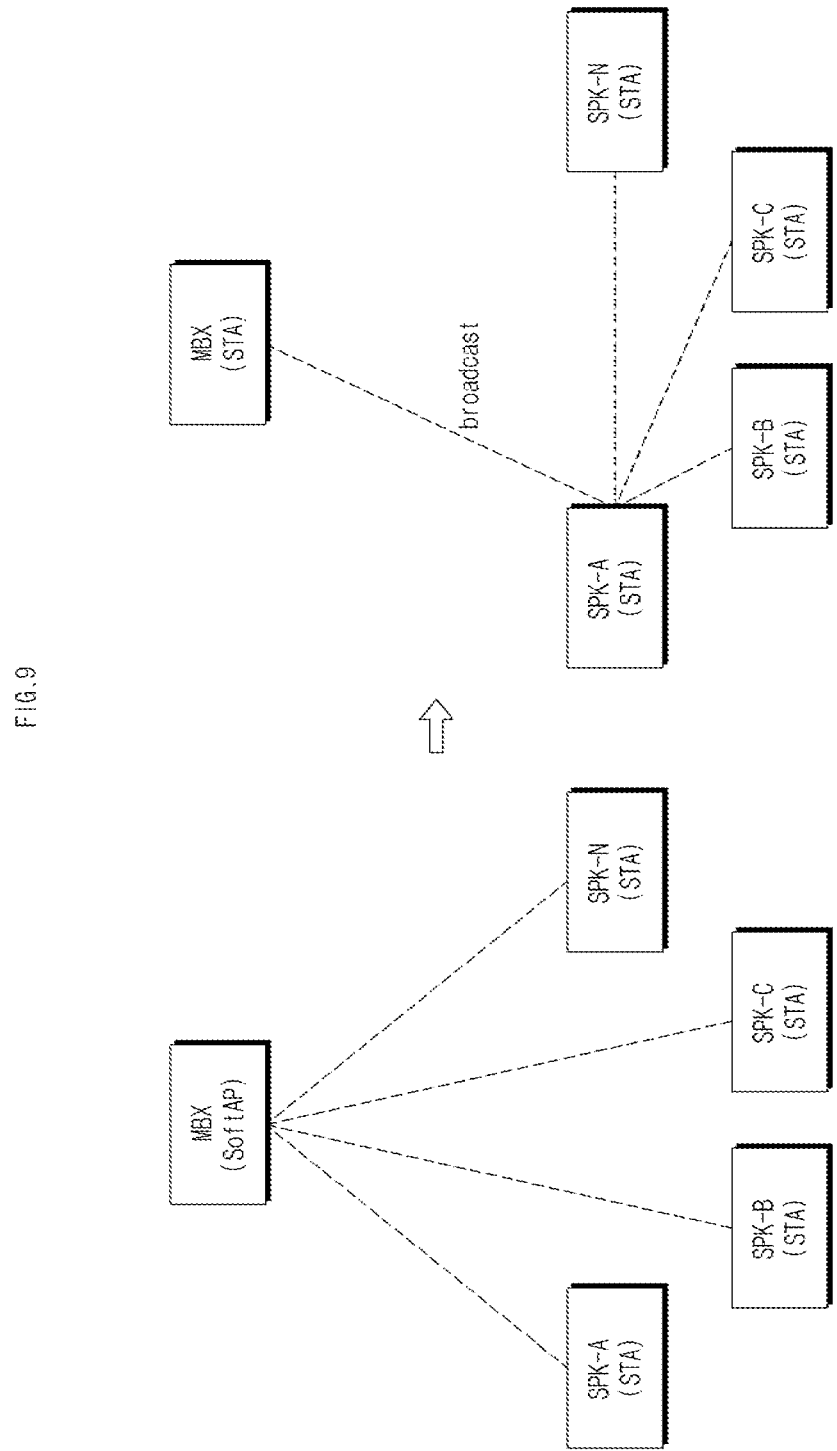
FIGS. 9 to 11C are diagrams referred to describe the operation shown in FIG. 8.

First, FIG. 9 is a diagram illustrating the access point mode and the station mode of the wireless audio transmission device MBX.

Referring to FIG. 9, according to the step 810 to step S825 shown in FIG. 8, the wireless audio transmission device MBX operates in the access point mode, and the plurality of wireless sound output devices SPK-A to SPK-D operates in the station mode.

Accordingly, the transceiver 635 of the wireless audio transmission device MBX may transmit a synchronization request message to the plurality of wireless sound output devices SPK-A to SPK-D wirelessly and receive a synchronization response message from at least one of the plurality of wireless sound output devices SPK-A to SPK-D wirelessly.

Thereafter, if the time offset calculation is unavailable, for example, if the synchronization response message from one wireless sound output device among the plurality of wireless sound output devices SPK-A to SPK-D is not received and the time offset calculation for the corresponding wireless sound output device is unavailable, the wireless audio transmission device MBX is switched from the access point mode to the station mode.

Specifically, among the plurality of wireless sound output devices SPK-A to SPK-D, the first sound output device SPK-A may be switched from the station mode to the access point mode, and the remaining wireless sound output devices SPK-B to SPK-D may maintain the station mode.

Accordingly, the transceiver 735 of the first sound output device SPK-A may transmit the second synchronization request message to the wireless audio transmission device MBX and the remaining wireless sound output devices SPK-B to SPK-D wirelessly and receive the second synchronization response message from the wireless audio transmission device MBX and at least one of the remaining wireless sound output devices SPK-B to SPK-D wirelessly. Accordingly, the rapid time offset calculation becomes available.

Figure 10:
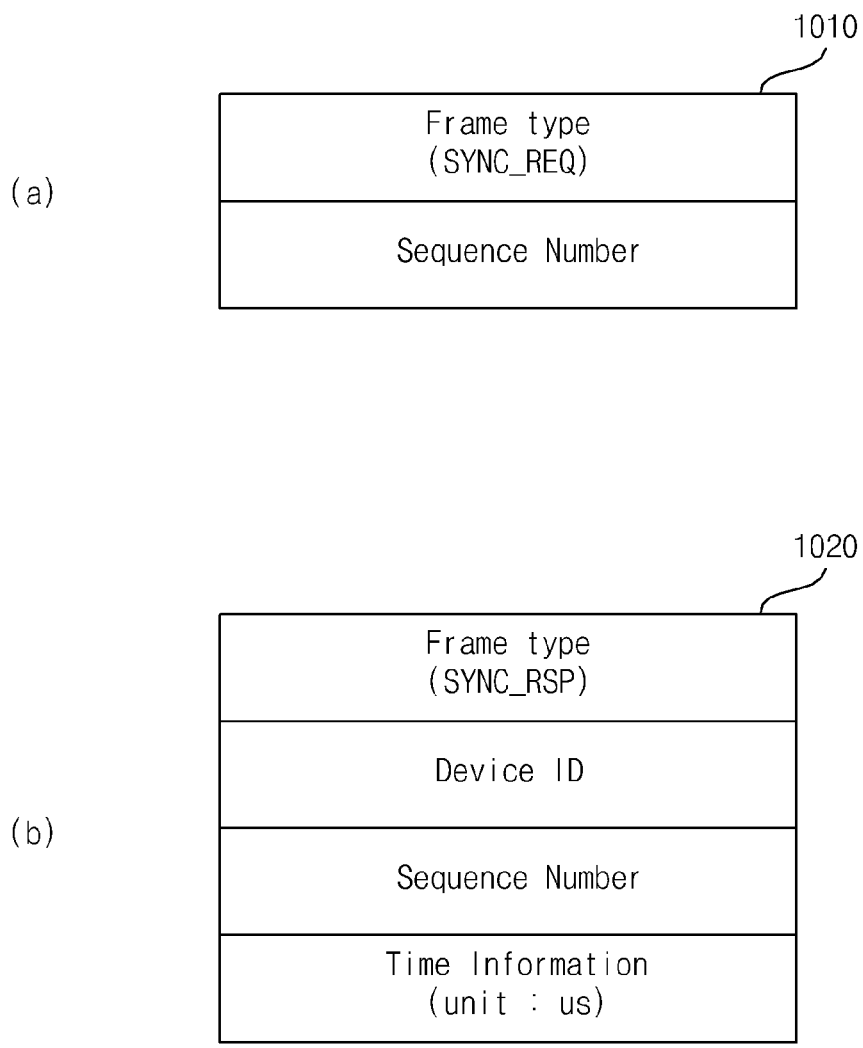

FIG. 10 is a diagram illustrating a structure of a synchronization request message and a synchronization response message.

First, the synchronization request message may include message type information and sequence number information.

The message type information of the synchronization request message may include information SYNC REQ that represents a synchronization request.

The sequence number information in the synchronization request message may be used to match a synchronization request to a synchronization response.

Next, the synchronization response message may include message type information, sequence number information, device ID information, and reception time information of the synchronization request message.

The message type information of the synchronization response message may include information SYNC_RSP that represents a synchronization response.

The device ID information may be used to distinguish a device of transmitting a message, and for example, the device ID information may include MAC address information.

The sequence number information in the synchronization response message may be used to match a synchronization request to a synchronization response.

The reception time information of the synchronization request message may include local time information on which the synchronization request message is received.

Figure 11A:
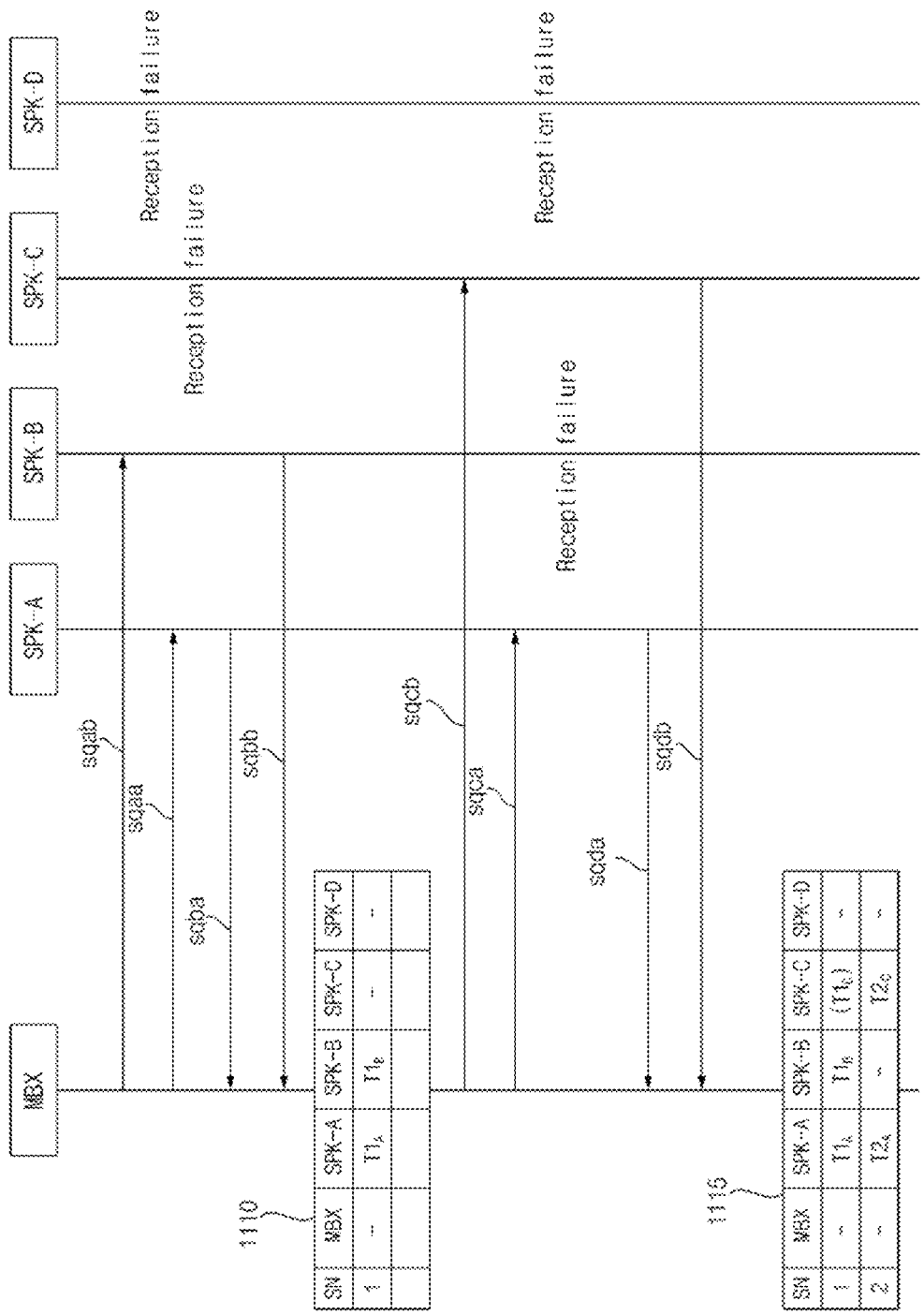
Figure 11B:
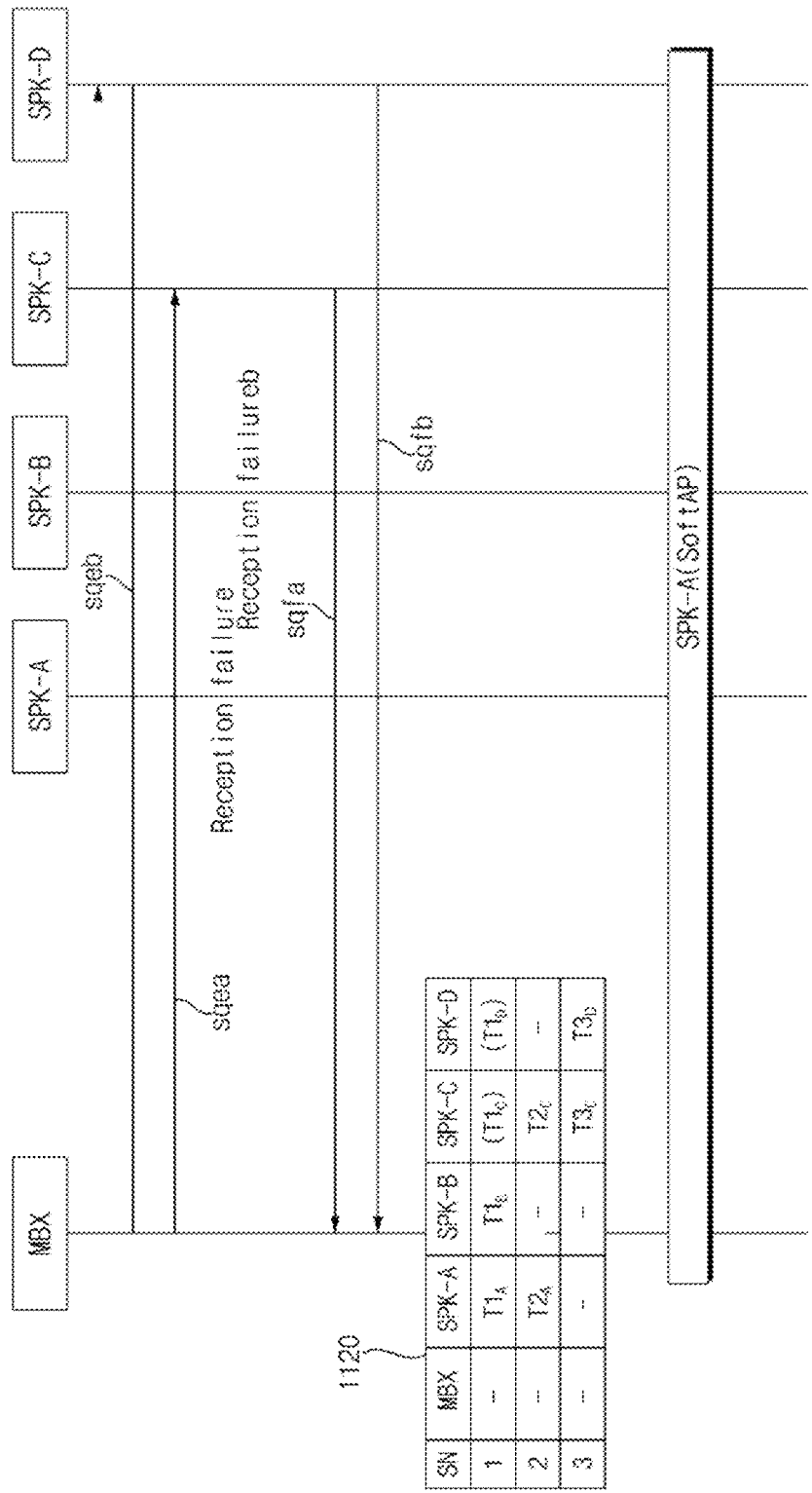
Figure 11C:
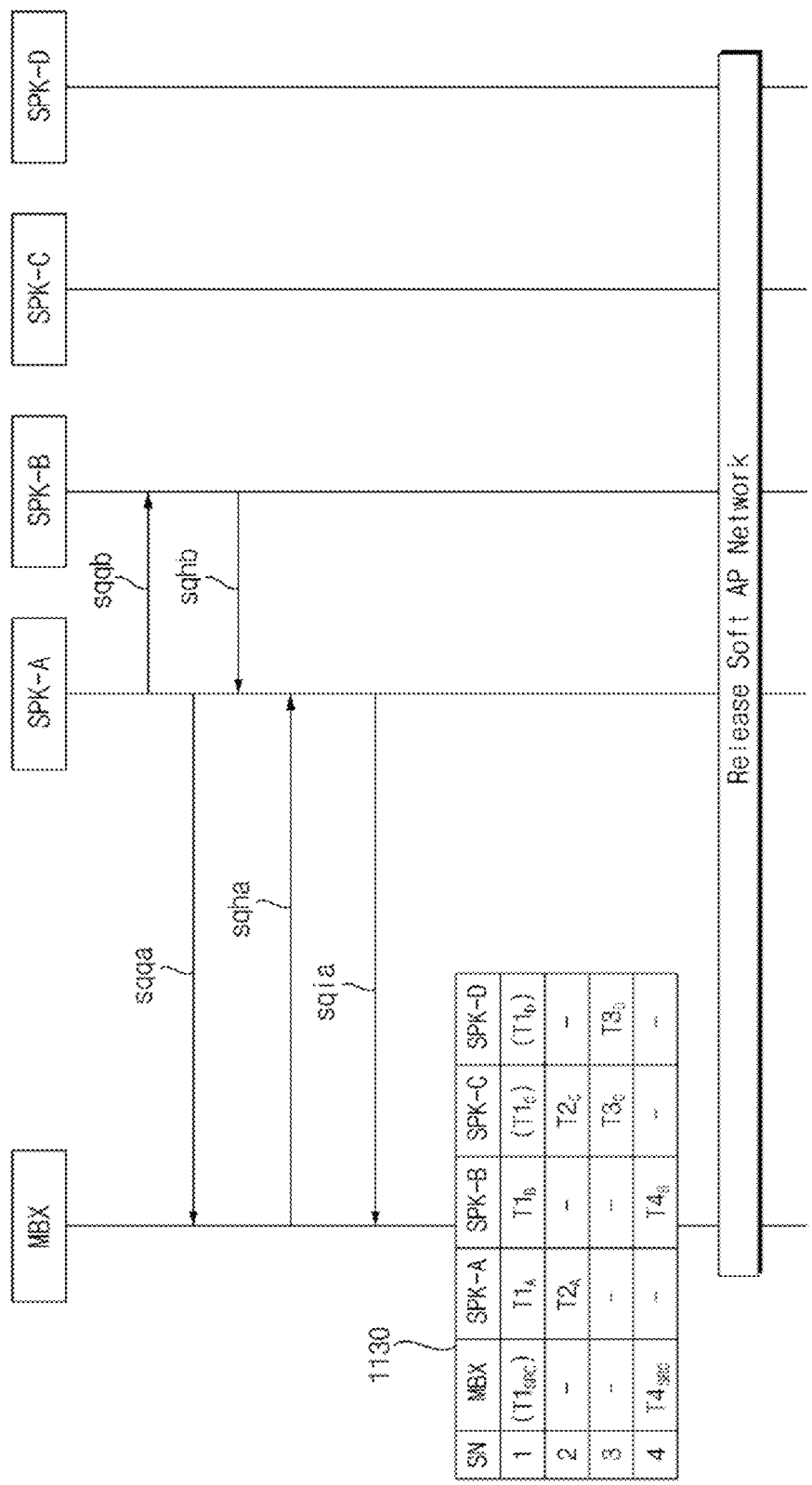

FIGS. 11A to 11C are diagrams referenced for time offset calculation.

First, FIG. 11A exemplifies that the wireless audio transmission device MBX transmits the synchronization request message to the plurality of wireless sound output devices SPK-A to SPK-D wirelessly in a state in which the wireless audio transmission device MBX is in the access point mode and the plurality of wireless sound output devices SPK-A to SPK-D is in the station mode.

In the drawing, it is exemplified that the wireless audio transmission device MBX transmits the synchronization request message sqaa to the first wireless sound output device SPK-A and transmits the synchronization request message sqab to the second wireless sound output device SPK-B.

Meanwhile, in the drawing, it is exemplified that the transmissions of the synchronization request message to the third wireless sound output device SPK-C and the fourth wireless sound output device SPK-D have failed.

Accordingly, the wireless audio transmission device MBX may receive the synchronization request message sqba from the first wireless sound output device SPK-A and receive the synchronization request message sqbb from the second wireless sound output device SPK-B except the third wireless sound output device SPK-C and the fourth wireless sound output device SPK-D.

The processor 670 of the wireless audio transmission device MBX may update a time table 1110 based on the synchronization request message sqba and the synchronization request message sqbb.

The drawing illustrates that the time table 1110 includes local time information $T1_A$ of the first wireless sound output device SPK-A and local time information $T1_B$ of the second wireless sound output device SPK-B.

Thereafter, after the time table 1110 is partially completed, the wireless audio transmission device MBX may transmit the synchronization request message again to the plurality of wireless sound output devices SPK-A to SPK-D wirelessly.

The drawing illustrates that the retransmitted synchronization request message is received in the first wireless sound output device SPK-A as Sqca and received in the third wireless sound output device SPK-C as Sqcb, but failed in the second and fourth wireless sound output devices SPK-B and SPK-D.

Accordingly, the wireless audio transmission device MBX may receive the synchronization request message sqda from the first wireless sound output device SPK-A and receive the synchronization request message sqdb from the third wireless sound output device SPK-C except the second and fourth wireless sound output devices SPK-B and SPK-D.

The processor 670 of the wireless audio transmission device MBX may update a time table 1115 based on the synchronization request message sqda and the synchronization request message sqdb.

In the drawing, it is illustrated that the time table 1115 further includes local time information $T2_A$ of the first wireless sound output device SPK-A and local time information $T2_C$ of the third wireless sound output device SPK-C in addition to the local time information $T1_A$ of the first wireless sound output device SPK-A and local time information $T1_B$ of the second wireless sound output device SPK-B.

Thereafter, after the time table 1115 is partially completed, the wireless audio transmission device MBX may transmit the synchronization request message again to the plurality of wireless sound output devices SPK-A to SPK-D wirelessly.

FIG. 11B exemplifies that the wireless audio transmission device MBX transmits the synchronization request message again to the plurality of wireless sound output devices SPK-A to SPK-D wirelessly after the partial completion of the time table 1115.

The drawing illustrates that the retransmitted synchronization request message is received in the third wireless sound output device SPK-C as Sqea and received in the fourth wireless sound output device SPK-D as Sqeb, but failed in the first and second wireless sound output devices SPK-A and SPK-B.

Accordingly, the wireless audio transmission device MBX may receive the synchronization request message sqfa from the third wireless sound output device SPK-C and receive the synchronization request message sqfb from the fourth wireless sound output device SPK-D except the first and second wireless sound output devices SPK-A and SPK-B.

The processor 670 of the wireless audio transmission device MBX may update a time table 1120 based on the synchronization request message sqfa and the synchronization request message sqfb.

In the drawing, it is illustrated that the time table 1120 further includes local time information $T3_C$ of the third wireless sound output device SPK-C and local time information $T3_C$ of the fourth wireless sound output device SPK-D in addition to the local time information $T1_A$ of the first wireless sound output device SPK-A, the local time information $T1_B$ of the second wireless sound output device SPK-B, the local time information $T2_A$ of the first wireless sound output device SPK-A, and the local time information $T2_C$ of the third wireless sound output device SPK-C.

Meanwhile, in the time table 1120, the local time information for the plurality of wireless sound output devices SPK-A to SPK-D is updated, but the local time information of the wireless audio transmission device MBX is not updated.

Accordingly, the processor 670 of the wireless audio transmission device MBX may determine that the time offset calculation is unavailable.

Meanwhile, in a state in which the processor 670 of the wireless audio transmission device MBX receives a synchronization response message from at least one of the plurality of wireless sound output devices SPK-A to SPK-D, based on the received synchronization response message, in the case that the calculation of the time offset for the plurality of wireless sound output devices SPK-A to SPK-D is not completed, the processor 670 may control the wireless audio transmission device MBX to be switched from the access point mode to the station mode.

FIG. 11C illustrates that the first wireless sound output device SPK-A operates in the access point mode, and the remaining the second to fourth wireless sound output devices SPK-B to SPK-D and the wireless audio transmission device MBX operate in the station mode.

In the drawing, it is exemplified that the first wireless sound output device SPK-A transmits a second synchronization request message to the second to fourth wireless sound output devices SPK-B to SPK-D and the wireless audio transmission device MBX.

The drawing illustrates that the second synchronization request message transmitted from the first wireless sound output device SPK-A is received in the wireless audio transmission device MBX as Sqqa and received in the second wireless sound output device SPK-B as Sqqb, but failed in the third and fourth wireless sound output devices SPK-C and SPK-D.

Accordingly, the first wireless sound output device SPK-A may receive the second synchronization request message sqha from the wireless audio transmission device MBX and receive the second synchronization request message sqhb from the second wireless sound output device SPK-B except the third and fourth wireless sound output devices SPK-C and SPK-D.

In addition, the first wireless sound output device SPK-A may transmit information for the received second synchronization request message sqha and second synchronization request message sqhb to the wireless audio transmission device MBX that operates in the station mode.

The transceiver 635 of the wireless audio transmission device MBX may receive the information for the second synchronization request message sqha and the second synchronization request message sqhb from the first wireless sound output device SPK-A, and the processor 670 of the wireless audio transmission device MBX may update a time table 1130 based on the information for the second synchronization request message sqha and the second synchronization request message sqhb from the first wireless sound output device SPK-A.

In the drawing, it is illustrated that the time table 1130 further includes local time information $T4_{SRC}$ of the wireless audio transmission device MBX and local time information $T4_B$ of the second wireless sound output device SPK-D in addition to the local time information $T1_A$ of the first wireless sound output device SPK-A, the local time information $T1_B$ of the second wireless sound output device SPK-B, the local time information $T2_A$ of the first wireless sound output device SPK-A, the local time information $T2_C$ of the third wireless sound output device SPK-C, the local time information $T3_C$ of the third wireless sound output device SPK-C and the local time information T30 of the fourth wireless sound output device SPK-D.

Meanwhile, in the time table 1130, the local time information for the plurality of wireless sound output devices SPK-A to SPK-D is updated, but the local time information of the wireless audio transmission device MBX is also updated.

Accordingly, the processor 670 of the wireless audio transmission device MBX may determine that the time offset calculation is available.

The processor 670 of the wireless audio transmission device MBX calculates the time offset for the plurality of wireless sound output devices SPK-A to SPK-D based on the time table 1130 shown in FIG. 11C.

Furthermore, the processor 670 of the wireless audio transmission device MBX may calculate playback time information of each of the wireless sound output devices SPK-A to SPK-D based on the respective time offset of the plurality of wireless sound output devices SPK-A to SPK-D.

In addition, the transceiver 635 of the wireless audio transmission device MBX may transmit the audio packet including the configured playback time information wirelessly to each of the wireless sound output devices SPK-A to SPK-D.

Accordingly, each of the wireless sound output devices SPK-A to SPK-D may playback the received audio signal based on the configured playback time information and output the corresponding sound. Therefore, the sound synchronized among the plurality of wireless sound output devices SPK-A to SPK-D may be output.

While the present disclosure has been particularly shown and described with reference to exemplary embodiments thereof, it will be understood by those of ordinary skill in the art that various changes in form and detail may be made herein without departing from the spirit and scope of the present disclosure as defined by the following claims and such modifications and variations should not be understood individually from the technical idea or aspect of the present disclosure.

What is claimed is:

1. A wireless audio transmission device comprising:
   a transceiver configured to transmit an audio signal wirelessly to a plurality of wireless sound output devices; and
   a processor configured to control the transceiver,
   wherein, based on the wireless audio transmission device being in an access point mode and the plurality of wireless sound output devices being in a station mode, the transceiver is configured to transmit a synchronization request message wirelessly to the plurality of wireless sound output devices and receive a synchronization response message wirelessly from at least one of the plurality of wireless sound output devices, and
   wherein, after receiving the synchronization response message, based on the wireless audio transmission device being in the station mode and a first wireless sound output device among the plurality of wireless sound output devices being in the access point mode, the transceiver is configured to receive a second synchronization request message wirelessly from the first wireless sound output device and transmit a second synchronization response message wirelessly to the first wireless sound output device.

2. The wireless audio transmission device of claim 1, wherein, in a state in which the processor receives the synchronization response message from at least one of the plurality of wireless sound output devices, when a calculation of a time offset for the plurality of wireless sound output devices is not completed based on the received synchronization response message, the processor is configured to switch the wireless audio transmission device from the access point mode to the station mode.

3. The wireless audio transmission device of claim 1, wherein, in a state in which the processor receives the synchronization response message from at least one of the plurality of wireless sound output devices, when a calculation of a time offset for the plurality of wireless sound output devices is completed based on the received synchronization response message, the processor is configured to transmit the audio signal in accordance with the time offset to the plurality of wireless sound output devices, respectively.

4. The wireless audio transmission device of claim 3, wherein the transceiver is configured to transmit an audio packet including playback time information, which is predetermined based on the time offset, to each of the wireless sound output devices wirelessly.

5. The wireless audio transmission device of claim 1, wherein the transceiver is configured to receive information regarding the second synchronization response message for at least some of the plurality of wireless sound output devices received from the first wireless sound output device wirelessly, and
   wherein, when a calculation for a time offset for the plurality of wireless sound output devices is completed based on the information regarding the second synchronization response message for at least some of the plurality of wireless sound output devices, the processor is configured to transmit the audio signal in accordance with the time offset to the plurality of wireless sound output devices, respectively.

6. The wireless audio transmission device of claim 5, wherein the transceiver is configured to transmit an audio packet including playback time information, which is predetermined based on the time offset, to each of the wireless sound output devices wirelessly.

7. The wireless audio transmission device of claim 1, wherein the synchronization request message includes a broadcast message, and the synchronization response message includes a unicast message.

8. The wireless audio transmission device of claim 1, wherein the synchronization request message includes a Wi-Fi broadcast message.

9. The wireless audio transmission device of claim 1, wherein the synchronization request message includes message type information and sequence number information, and
wherein the synchronization response message includes message type information, sequence number information, device ID information, and reception time information of the synchronization request message.

10. A wireless sound output device, device comprising:
a transceiver configured to receive an audio signal wirelessly from a wireless audio transmission device;
an audio output device configured to output sound based on the audio signal received in the transceiver; and
a processor configured to control the audio output device,
wherein, based on the wireless audio transmission device being in an access point mode and the wireless sound output device being in a station mode, the transceiver is configured to receive a synchronization request message wirelessly from the wireless audio transmission device and transmit a synchronization response message wirelessly in response to the synchronization request message, and
wherein, after receiving the synchronization response message, based on the wireless audio transmission device being in the station mode and the wireless sound output device being switched to the access point mode, the transceiver is configured to transmit a second synchronization request message wirelessly to the wireless audio transmission device and a plurality of wireless sound output devices different from the wireless sound output device and receive a second synchronization response message wirelessly from the wireless audio transmission device and at least some of the plurality of wireless sound output devices in response to the synchronization response message.

11. The wireless sound output device of claim 10, wherein the transceiver is configured to transmit information regarding the second synchronization response message respectively received from at least some of the plurality of wireless sound output devices wirelessly to the wireless audio transmission device.

12. The wireless sound output device of claim 10, wherein the transceiver is configured to receive the audio signal in accordance with a time offset configured from the wireless audio transmission device, and
wherein, in response to the time offset, the audio output device is configured to output the sound.

13. The wireless audio transmission device of claim 10, wherein the transceiver is configured to receive an audio packet including playback time information, which is predetermined, from the wireless audio transmission device, and
wherein, in response to the playback time information, the audio output device is configured to output sound corresponding to the audio packet.

14. A wireless sound output system comprising:
a wireless audio transmission device; and
a plurality of wireless sound output devices,
wherein, based on the wireless audio transmission device being in an access point mode and the plurality of wireless sound output devices being in a station mode, the wireless audio transmission device is configured to transmit a synchronization request message wirelessly to the plurality of wireless sound output devices and receive a synchronization response message wirelessly from at least one of the plurality of wireless sound output devices, and
wherein, based on a calculation of a time offset for the plurality of wireless sound output devices being not completed, the wireless audio transmission device is switched from the access point mode to the station mode, and any one sound output device among the plurality of wireless sound output devices is switched from the station mode to the access point mode.

15. The wireless sound output system of claim 14, wherein the wireless audio transmission device comprises:
a transceiver configured to transmit an audio signal wirelessly to the plurality of wireless sound output devices; and
a processor configured to control the transceiver,
wherein, after receiving the synchronization response message, based on the wireless audio transmission device being in the station mode and a first wireless sound output device among the plurality of wireless sound output devices being in the access point mode, the transceiver is configured to receive a second synchronization request message wirelessly from the first wireless sound output device and transmit a second synchronization response message wirelessly to the first wireless sound output device.

16. The wireless sound output system of claim 15, wherein, in a state in which the processor receives the synchronization response message from at least one of the plurality of wireless sound output devices, when a calculation of a time offset for the plurality of wireless sound output devices is completed based on the received synchronization response message, the processor is configured to transmit the audio signal in accordance with the time offset to the plurality of wireless sound output devices, respectively.

17. The wireless sound output system of claim 16, wherein the transceiver is configured to transmit an audio packet including playback time information, which is predetermined based on the time offset, to each of the wireless sound output devices wirelessly.

18. The wireless sound output system of claim 15, wherein the transceiver is configured to receive information regarding the second synchronization response message for at least some of the plurality of wireless sound output devices received from the first wireless sound output device wirelessly, and
wherein, when a calculation for a time offset for the plurality of wireless sound output devices is completed based on the information regarding the second synchronization response message for at least some of the plurality of wireless sound output devices, the processor is configured to transmit the audio signal in accordance with the time offset to the plurality of wireless sound output devices, respectively.

19. The wireless sound output system of claim 14, wherein the at least one of the plurality of wireless sound output devices comprises:
a transceiver configured to receive an audio signal wirelessly from the wireless audio transmission device;

an audio output device configured to output sound based on the audio signal received in the transceiver; and a processor configured to control the audio output device.

20. The wireless sound output system of claim 19, wherein the transceiver is configured to receive an audio packet including playback time information, which is predetermined, from the wireless audio transmission device, and wherein, in response to the playback time information, the audio output device is configured to output sound corresponding to the audio packet.

* * * * *